(12) United States Patent
Imoto et al.

(10) Patent No.: US 9,503,604 B2
(45) Date of Patent: Nov. 22, 2016

(54) ILLUMINATING DEVICE, IMAGE READING APPARATUS, AND IMAGE FORMING APPARATUS

(71) Applicant: FUJI XEROX CO., LTD., Tokyo (JP)

(72) Inventors: Yoshiya Imoto, Kanagawa (JP); Masao Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 114 days.

(21) Appl. No.: 14/331,843

(22) Filed: Jul. 15, 2014

(65) Prior Publication Data

US 2015/0271354 A1    Sep. 24, 2015

(30) Foreign Application Priority Data

Mar. 18, 2014 (JP) ................. 2014-055452

(51) Int. Cl.
  *G02B 27/09* (2006.01)
  *H04N 1/028* (2006.01)
(52) U.S. Cl.
  CPC ...... *H04N 1/02815* (2013.01); *G02B 27/0966* (2013.01)
(58) Field of Classification Search
  CPC  G02B 27/0172; G02B 27/0966; G02B 3/06; G02B 19/0014; G02B 19/0061; F21Y 2101/02; F21V 5/04; H04N 1/02815; H04N 1/028

USPC .............................. 359/710; 362/308, 311.06
See application file for complete search history.

(56) References Cited

U.S. PATENT DOCUMENTS

| | | | |
|---|---|---|---|
| 2005/0111115 A1 | 5/2005 | Tatsuno et al. | |
| 2005/0195452 A1 | 9/2005 | Tatsuno | |
| 2015/0167924 A1* | 6/2015 | Uchida | .............. G02B 19/0014 362/311.09 |

FOREIGN PATENT DOCUMENTS

| | | |
|---|---|---|
| JP | A-2005-117602 | 4/2005 |
| JP | A-2005-278132 | 10/2005 |
| JP | A-2005-311662 | 11/2005 |
| JP | A-2009-75184 | 4/2009 |
| JP | A-2010-199875 | 9/2010 |
| WO | WO 2014/017262 | * 1/2014 |

\* cited by examiner

*Primary Examiner* — James Phan
(74) *Attorney, Agent, or Firm* — Oliff PLC

(57) ABSTRACT

Provided is an illuminating device including a cylindrical lens in which a light incidence surface and a light emission surface, which are opposite to each other, extend in a longitudinal direction, and a light source that is disposed in such a manner that a positional relationship between a paraxial virtual image of the light source due to the light incidence surface of the cylindrical lens and a center of curvature of the light emission surface is in a predetermined range.

20 Claims, 18 Drawing Sheets

LONGITUDINAL DIRECTION   CROSS-SECTIONAL DIRECTION

CROSS-SECTIONAL DIRECTION

CROSS-SECTIONAL DIRECTION

LONGITUDINAL DIRECTION

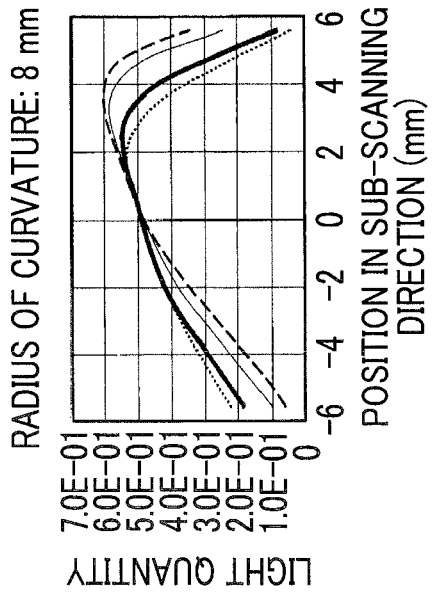
FIG. 10A
FIG. 10B
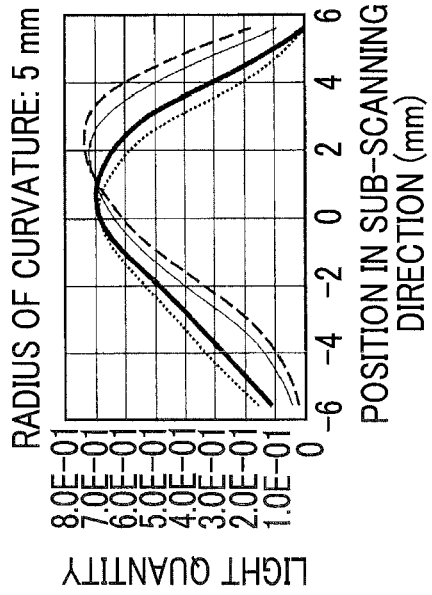
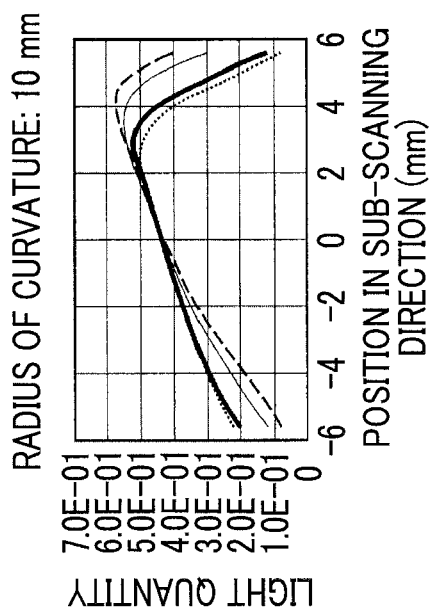
FIG. 10C
FIG. 10D
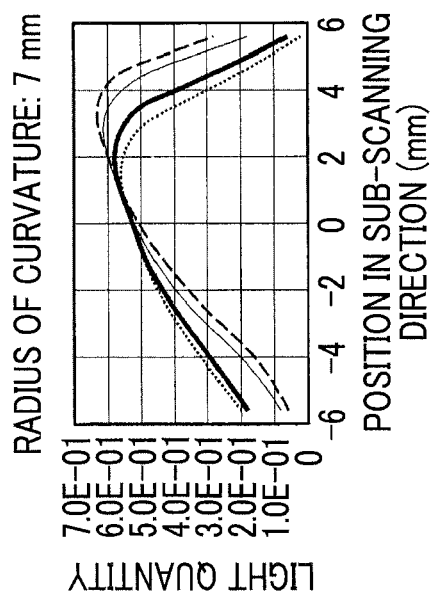

RELATED ART

ILLUMINATING DEVICE, IMAGE READING APPARATUS, AND IMAGE FORMING APPARATUS

CROSS-REFERENCE TO RELATED APPLICATIONS

This application is based on and claims priority under 35 USC 119 from Japanese Patent Application No. 2014-055452 filed Mar. 18, 2014.

BACKGROUND (i) Technical Field

The present invention relates to an illuminating device, an image reading apparatus, and an image forming apparatus.

(ii) Related Art

In general, in an image reading apparatus, an image carrier on which an image is drawn is irradiated with light beams from an illuminating device, light beams that are reflected are received by a light receiving element, and the received light beams are converted into electrical signals, thereby reading the image that is drawn on the image carrier. As a reading method, various methods are known. In one method among the methods, the image carrier is illuminated by the illuminating device in one direction, an image is read in the one direction that is illuminated, and reading is repeated while relatively moving the image carrier and an illuminating and reading region, thereby reading a two-dimensional image. In this case, the illuminating device performs illumination in a linear shape.

SUMMARY

According to an aspect of the invention, there is provided an illuminating device including:

a cylindrical lens in which a light incidence surface and a light emission surface, which are opposite to each other, extend in a longitudinal direction; and a light source that is disposed in such a manner that a positional relationship between a paraxial virtual image of the light source due to the light incidence surface of the cylindrical lens and a center of curvature of the light emission surface is in a predetermined range.

BRIEF DESCRIPTION OF THE DRAWINGS

Exemplary embodiments of the present invention will be described in detail based on the following figures, wherein:

FIGS. 10A to 10D are explanatory views of a specific example of a variation in characteristics due to a variation in a radius of curvature of a light emission surface;

DETAILED DESCRIPTION

Figure 1A:
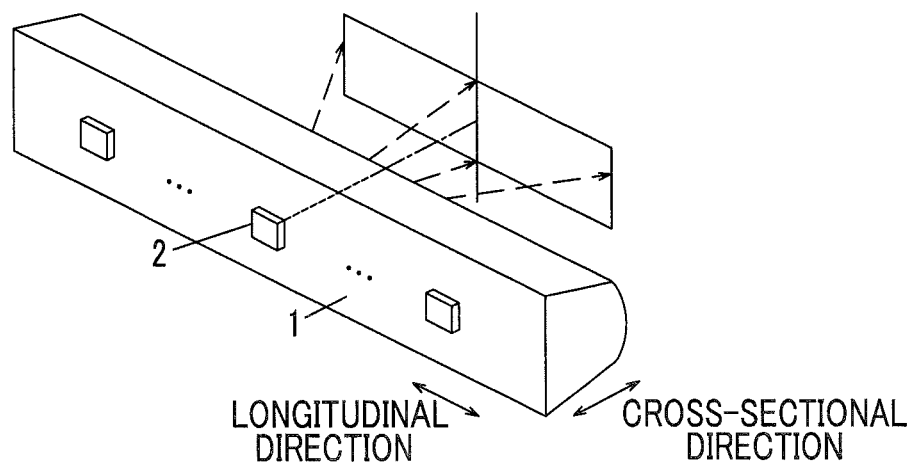
FIGS. 1A and 1B are configuration views illustrating an embodiment of an illuminating device of the invention.
Figure 1B:
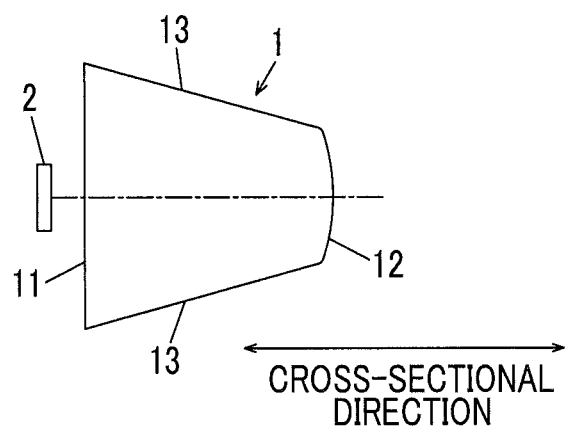

FIGS. 1A and 1B are configuration views illustrating an embodiment of an illuminating device of the invention, in which FIG. 1A is a perspective view, and FIG. 1B is a cross-sectional view. In the drawings, a reference numeral 1 indicates a cylindrical lens, a reference numeral 2 indicates a light source, a reference numeral 11 indicates a light incidence surface, a reference numeral 12 indicates a light emission surface, and a reference numeral 13 indicates a side surface.

The cylindrical lens 1 is a cylindrical light guiding member in which a light incidence surface and a light emission surface, which are opposite to each other, extend in a longitudinal direction. An example of a cross-section in a direction perpendicular to the longitudinal direction of the cylindrical lens 1 is shown in FIG. 1B. In the example of the cylindrical lens 1 shown in FIG. 1B, an upper base, which is a base of a trapezoid on a short side, is set to have an arc shape, and an arc-shaped surface on the upper base side becomes the light emission surface 12. A lower base, which is a base of the trapezoid on a longer side, is a flat surface in this example, and a surface on the lower base side becomes the light incidence surface 11. A leg of the trapezoid constitutes the side surface 13, a width of the cross-section becomes narrower, as it goes from the lower base to the upper base of the trapezoid, that is, from the light incidence surface 11 side to the light emission surface 12 side. There is no limitation as long as the trapezoid is an isosceles trapezoid, and the trapezoid has a cross-section in which the upper base has an arc shape.

The light source 2 is disposed at plural sites on a light incidence surface side of the cylindrical lens 1 in the longitudinal direction. The light source 2 is disposed in such a manner that a virtual image due to the light incidence surface 11 of the cylindrical lens 1 is in a predetermined range including a center of curvature of the light emission surface 12. For example, each of the light sources 2 may be a point light source such as an LED or an electric light bulb, but it is needless to say that the light source 2 may be a light-emitting element such as a white LED having a fluorescent substance and an EL element which has an area, and various light-emitting elements may be used.

Figure 2A:
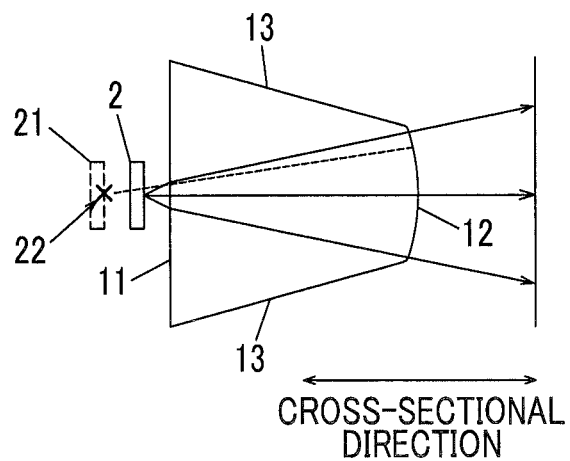
FIGS. 2A and 2B are explanatory views of an example of a path of light beams in the embodiment of the illuminating device of the invention.
Figure 2B:
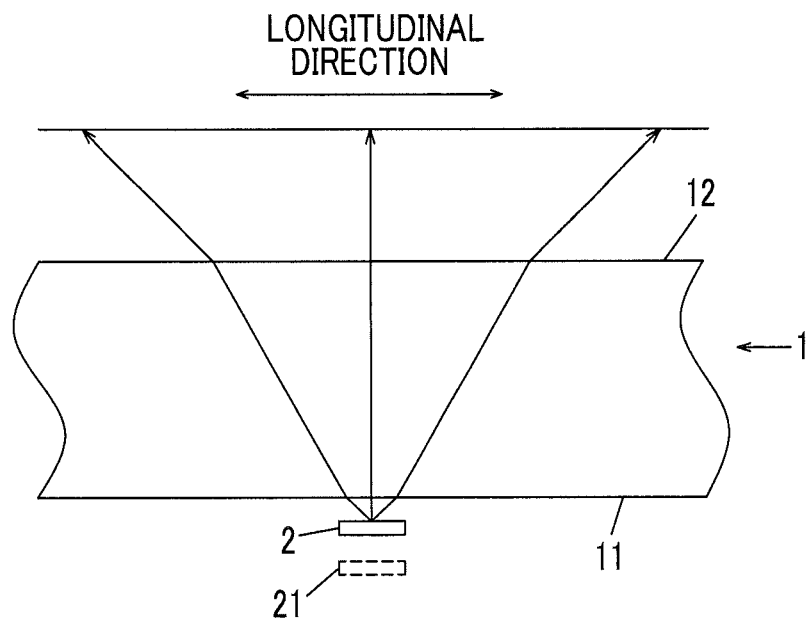

The configuration of the embodiment of the above-described illuminating device will be further described. FIGS. 2A and 2B are explanatory views of an example of a path of light beams in the embodiment of the illuminating device of the invention. In the drawings, a reference numeral 21 indicates a virtual image, and a reference number 22 indicates a center of the curvature of the light emission surface. Light beams that are radiated from the light source 2 are incident to the light incidence surface 11 of the cylindrical lens 1. Here, the light incidence surface 11 set to be a flat surface as an example, but light beams are refracted on the flat surface. Accordingly, even when the light incidence surface 11 is a flat surface, a light condensing effect is obtained. The light beams that are incident to the cylindrical lens 1 are refracted, and thus a virtual image of the light source 2 is present, and the virtual image is indicated by a broken line as the virtual image 21.

On the other hand, the light emission surface 12 of the cylindrical lens 1 is set to have an arc shape, and thus a center of the arc is shown as the center of curvature 22. In the embodiment of the illuminating device, the light source 2 is disposed in such a manner that a virtual image of the light source 2 due to the light incidence surface 11 of the cylindrical lens 1 enters a predetermined range including the center of curvature of the light emission surface 12.

Here, it is assumed that the light source 2 is disposed in such a manner that the virtual image 21 of the light source 2 becomes the center of curvature 22. FIG. 2A shows an example of a path of light beams in a cross-section including the light source 2 in a direction perpendicular to the longitudinal direction of the cylindrical lens 1. Light beams, which are radiated from the light source 2 and are incident to the light incidence surface of the cylindrical lens 1, proceed to the light emission surface 12. Since the virtual image 21 of the light source 2 is in the center of curvature 22, the light beams, which enter the inside of the cylindrical lens 1, proceed along tracks that radially extend from the center of curvature 22. Then, the light beams reach the light emission surface 12.

The light beams, which reach the light emission surface 12, may be considered as light beams from the center of curvature 22 and are incident to the light emission surface 12 from a normal direction of the arc-shaped light emission surface 12. Accordingly, the light beams are emitted in the normal direction of the light emission surface 12 without being refracted at the light emission surface 12.

FIG. 2B shows an example of the path of light beams in a cross-section including the light source 2 in the longitudinal direction of the cylindrical lens 1. Light beams, which are not perpendicular to an axis in the longitudinal direction, are referred to as skew light beams. In addition, an angle between an orthogonal plane and light beams is referred to as a skew angle. Light beams, which are radiated from the light source 2, are also radiated in the longitudinal direction of the cylindrical lens 1. The light beams are also incident to the inside of the cylindrical lens 1 after being refracted on the light incidence surface 11 in accordance with incidence conditions such as an index of refraction. In addition, light beams, which reach the light emission surface 12, are refracted in the longitudinal direction in accordance with an incidence angle to the light emission surface 12 and the index of refraction, and then the refracted light beams are emitted.

At this time, in a cross-sectional direction perpendicular to the longitudinal direction, light beams are not refracted as described above, and are not affected by the aberration. The center of curvature of the cylindrical lens 1 becomes a straight line (central axis of curvature) in a three-dimensional space. When considering a plane in the three-dimensional space including an emission point of light beams on the light emission surface 12 and the central axis of curvature, a normal vector of the emission point on the light emission surface is present on the plane that passes through the center of curvature, and light beams ranging from the virtual image 21 of the light source 2 that is present at the center of curvature to the emission point are present on the plane. According to this, light beams that reach the light emission surface 12 from the center of curvature are not refracted in a direction perpendicular to the longitudinal direction. As a result, an effect on a light condensing effect due to the aberration in the related art, which occurs with respect to light beams radiated in the longitudinal direction, is excluded. According to this, the intensity of light beams varies due to a distance to an object to be illuminated, but a luminance distribution in a region that is illuminated does not depend on the distance to the object to be illuminated. In addition, a light quantity further increases due to a light condensing effect on the light incidence surface 11 in comparison to a case where the light source 2 is used alone.

In the description stated above, the light source 2 is disposed in such a manner that the virtual image 21 of the light source 2 becomes the center of curvature 22. However, the position of the light source 2 may be close to the cylindrical lens 1 or spaced away from the cylindrical lens 1 in a predetermined range in which convergence due to the aberration is permitted and which includes the center of curvature 22 of the light emission surface 12.

In addition, as the distance between the light source 2 and the light incidence surface 11 of the cylindrical lens 1 increases, a deviation from the virtual image position with respect to the skew light beams that are radiated from the light source 2 increases, and thus a deviation from the center of curvature occurs in light beams after refraction on the light incidence surface 11. Therefore, with regard to light beams emitted from the light emission surface 12, light beams other than light beams in the normal direction increase, and thus a light condensing operation due to the aberration also occurs with respect to light beams that proceed in the longitudinal direction of the cylindrical lens 1. As the distance between the light source 2 and the light incidence surface 11 decreases, the deviation of light beams from a center of curvature decreases as a homothetic ratio. Accordingly, the shorter the distance between the light source 2 and the light incidence surface 11 of the cylindrical lens 1 is, the more preferable. In addition, as described above, the virtual image 21 of the light source 2 is preferably closer to the center of curvature 22 of the light emission surface 12, and thus the distance between the light incidence surface 11 and the light emission surface 12 of the cylindrical lens 1, the curvature of the light emission surface 12, and the like may be designed according to the preference.

Next, the side surface 13 of the cylindrical lens 1 will be described. As described above, in the cylindrical lens 1, logically, light beams that are incident from a normal direction of the light emission surface 12 are emitted in the normal direction, and incidence and emission of light beams are performed in an error range that is permitted from the normal direction of the light emission surface 12, thereby preventing convergence due to the aberration of the cylindrical lens 1. When light beams other than the light beams in the error range that is permitted from the normal direction of the light emission surface 12 are leaked to the outside, the exposure has an effect on a luminance distribution in a region that is illuminated, and thus these light beams are set not to be exposed to the outside. Accordingly, an angle of the side surface 13 and a distance between the light incidence surface 11 and the light emission surface 12 may be set to satisfy angle conditions in which among light beams incident from the light incidence surface 11, light beams incident to the side surface 13 are totally reflected, and among the reflected lights, light beams incident to the light emission surface 12 are totally reflected from the light emission surface 12 or light beams refracted at the light emission surface 12 are not present across the region that is illuminated.

Figure 3:
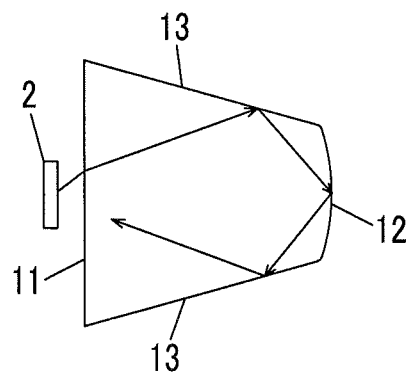
FIG. 3 is an explanatory view of an example of a path of light beams incident from a side surface of a cylindrical lens.

FIG. 3 is an explanatory view of an example of a path of light beams incident to the side surface of the cylindrical lens 1. Here, as the cylindrical lens 1, an example having a cross-sectional shape in which an upper base of an isosceles trapezoid is set to have an arc shape is illustrated, and each surface that is a leg of the trapezoid becomes the side surface 13. A pair of the side surfaces 13 is set to satisfy the above-described conditions.

Light beams, which are radiated from the light source 2, are refracted at the light incidence surface 11 of the cylindrical lens 1 and are incident to the inside of the cylindrical lens 1. Light beams, which are reflected from the light incidence surface 11 in accordance with incidence conditions of the light incidence surface 11 and are not incident to the inside of the cylindrical lens 1, are also present.

As described above, among light beams incident to the inside of the cylindrical lens 1, light beams, which proceed toward the light emission surface 12 as is, are incident to the light emission surface 12 in a range including the normal direction of the light emission surface 12 at a cross-section perpendicular to the longitudinal direction of the cylindrical lens 1, and are emitted from the light emission surface 12.

Light beams, which are incident to the inside of the cylindrical lens 1 and proceed toward the side surface 13 that is obliquely provided, are totally reflected from the side surface 13 due to the above-described conditions. The light beams, which are totally reflected from the side surface 13, proceed toward the light emission surface 12 and an opposite side surface 13. Due to the above-described conditions, the light beams, which are totally reflected from the side surface 13 and proceed toward the light emission surface 12, are totally reflected from the light emission surface 12, or light beams, which are refracted at the light emission surface 12, are emitted at an angle such that the light beams are not present across the region that is illuminated. When being totally reflected from the light emission surface 12, the light beams further proceed toward the side surface 13 that is opposite to the side surface 13 from which the light beams are totally reflected at first, are totally reflected from the opposite side surface 13, are returned to the light incidence surface 11, and are then emitted. Subsequently, the light beams are emitted. Accordingly, light beams, which are radiated from the light source 2, are incident to the inside of the cylindrical lens 1 from the light incidence surface 11, and proceed toward the side surface 13, are not emitted from the light emission surface 12.

Light beams, which are totally reflected from the side surface 13 and proceed toward the opposite side surface 13, may be totally reflected or leaked to the outside. Even when light beams are leaked to the outside from the side surface 13, the leakage direction is different from a direction of a region that is illuminated by light beams emitted from the light emission surface 12, and thus the leakage has no effect on the luminance distribution of the region that is illuminated. In addition, the light beams which are returned to the light incidence surface 11 include light beams which are returned again to the cylindrical lens 1, and thus the light beams are used in combination with light beams of the light source 2.

In addition, when the total reflection conditions from the light emission surface 12 are satisfied, light beams, which are incident to the inside of the cylindrical lens 1 and proceed toward the side surface 13, are not leaked from the side surface 13 or the light emission surface 12, but error may be permitted to a certain degree. Under conditions in which light beams refracted at the light emission surface 12 are not present across the region that is illuminated, even though light beams are leaked from the light emission surface 12, if the light beams are not present across the region that is illuminated, the light beams do not have an effect on the luminance distribution of the region that is illuminated even when the light beams are leaked from the light emission surface 12.

Figure 4:
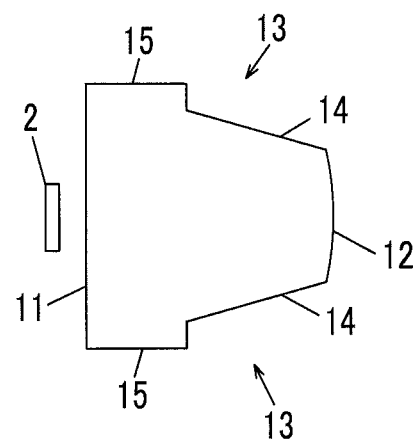
FIG. 4 is an explanatory view of another example of the cylindrical lens.

FIG. 4 is an explanatory view of another example of the cylindrical lens 1. In the drawing, a reference number 14 indicates an inclined portion, and a reference numeral 15 indicates a base portion. As illustrated in FIG. 3, with regard to the cylindrical lens 1, in a case of a cross-sectional shape in which an upper base of an isosceles trapezoid is set to have an arc shape, the side surface 13 becomes a leg of the trapezoid, that is, an inclined surface. When the side surface 13 is set to the inclined surface satisfying the above-described conditions, light beams that are transmitted from the side surface 13 or light beams that are reflected from the side surface 13 and are emitted from the light emission surface 12 are not incident to the region that is illuminated. Accordingly, a portion of the side surface 13, which is adjacent to the light emission surface 12, may be inclined to have the above-described function, and a portion of the side surface 13, which is adjacent to the light incidence surface 11, may have a different shape.

As an example of the case is shown in FIG. 4. In an example of the cylindrical lens 1 which is shown in FIG. 4, in the side surface 13, a portion which is adjacent to the light emission surface 12 is set as the inclined surface 14, and a portion which is adjacent to the light incidence surface 11 is set as the base portion 15, whereby the portions of the side surface 13 are set to have shapes different from each other. At least the inclined portion 14 may satisfy the above-described conditions. In addition, it is needless to say that a shape of the base portion 15 is not limited to the shape shown in the drawing.

In a configuration of the related art, light beams are collected in the light emission surface 12 by the side surface 13, and light beams that proceed toward the side surface 13 are also used for illumination. In contrast, in the embodiment of the illuminating device, light beams, which proceed toward the side surface 13, are not emitted. According to this, an illuminance distribution of a region, which is illuminated by controlled light beams that proceed from the light incidence surface 11 to the light emission surface 12, is not disturbed, and thus illumination is performed without a change in the illuminance distribution due to a distance between the light emission surface 12 and an object to be illuminated.

Figure 5:
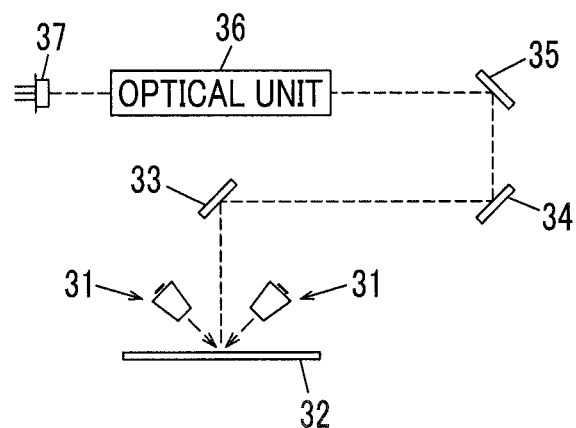
FIG. 5 is a configuration view illustrating an embodiment of an image reading apparatus of the invention.

An embodiment of an image reading apparatus that uses the embodiment of the illuminating device of the invention will be described. FIG. 5 is a configuration view illustrating an embodiment of the image reading apparatus of the invention. In the drawing, a reference numeral 31 indicates an illuminating device, a reference numeral 32 indicates an image carrier, reference numerals 33, 34, and 35 indicate a reflecting mirror, a reference numeral 36 indicates an optical unit, and a reference numeral 37 indicates a light receiving unit. The illuminating device 31 is the same as the illuminating device described in the embodiment of the illuminating device. The image carrier 32 is illuminated by the illuminating device 31, but at this time, the image carrier is irradiated with illumination light beams in a predetermined angle range with respect to the image carrier 32. The illumination light beams are emitted to a region that extends in the longitudinal direction of the cylindrical lens 1.

After illumination by light beams emitted from the illuminating device 31, light beams that are reflected from the image carrier 32 are received by the light receiving unit 37 through the reflecting mirrors 33, 34, and 35, and the optical unit 36 in order to read an image on the image carrier 32. As the light receiving unit 37, a one-dimensional sensor is used to read a one-dimensional image in the longitudinal direction of the cylindrical lens 1 that is irradiated with the illumination light beams. Here, the longitudinal direction of the cylindrical lens 1 is set as a main scanning direction. A direction perpendicular to the main scanning direction is set as a sub-scanning direction. Reading of the one-dimensional image is repeated while moving the image carrier 32 in the sub-scanning direction, thereby obtaining a two-dimensional image.

When moving the image carrier 32, a distance between the illuminating device 31 and the image carrier 32 may vary in cases such as a case where the image carrier 32 floats, and a case where unevenness occurs on a surface of the image carrier 32. With regard to these cases, in the illuminating device of the related art, a light quantity during illumination of the image carrier 32 varies in some cases. When the light quantity during illumination varies, a light quantity during light reception at the light receiving unit 37 varies, and thus signals that are output also vary. This variation has an effect on, for example, brightness or a color of an image.

In the embodiment of the image reading apparatus, the illuminating device described in the embodiment of the illuminating device is used, and the illumination light beams are emitted to the image carrier 32 in a predetermined angle range, and thus even when the distance between the illuminating device 31 and the image carrier 32 varies, the light quantity during illumination is set not to vary. Hereinafter, this configuration will be further described.

Figure 6:
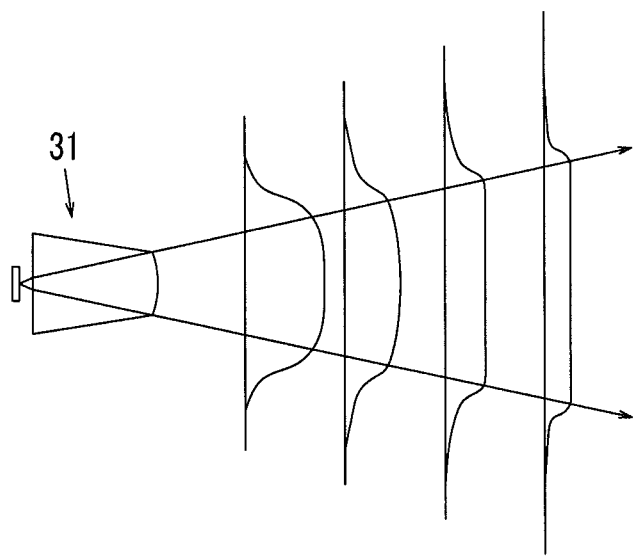
FIG. 6 is an explanatory view of an example of a distance from the illuminating device and a light intensity distribution.

FIG. 6 is an explanatory view of an example of a relationship between distance from the illuminating device and a light intensity distribution. In a case of using the above-described illuminating device 31 described in the embodiment of the illuminating device, light beams are configured to be emitted in the normal direction of the arc-shaped light emission surface 12. Accordingly, the illumination light beams that are spread to a certain degree are emitted from the illuminating device 31. Due to the spreading of the light beams, the intensity of light beams varies in accordance with a distance from the illuminating device 31. However, even when the distance from the illuminating device 31 varies, an illuminance variation inside the region that is illuminated is suppressed to a permissible range or lower.

Figure 7A:
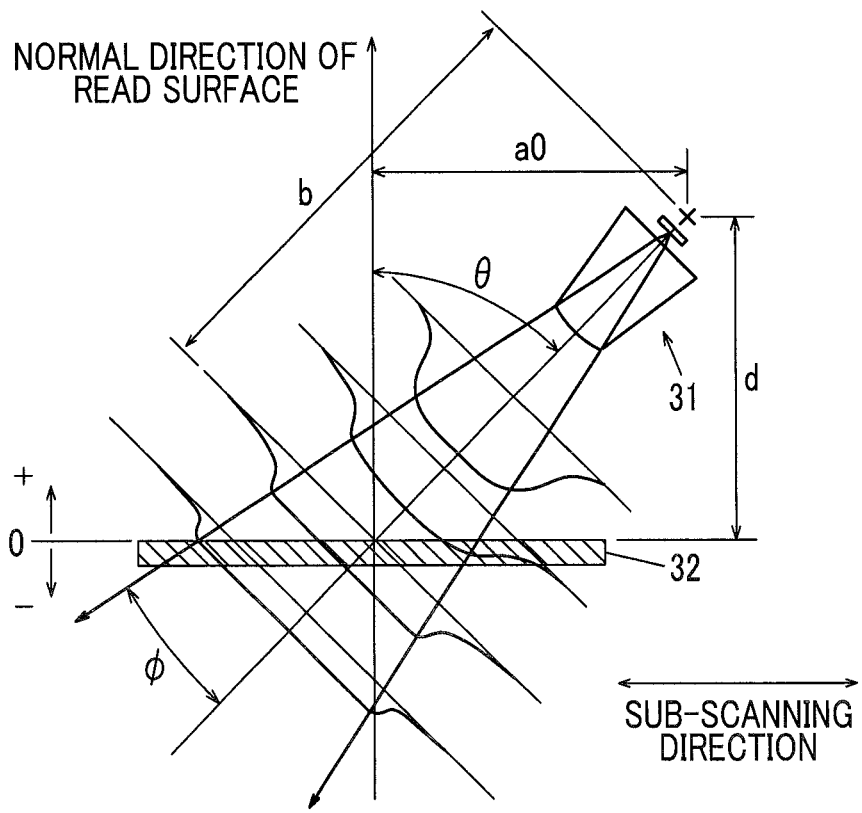
FIGS. 7A and 7B are explanatory views in a case where light beams are obliquely emitted from the illuminating device.
Figure 7B:
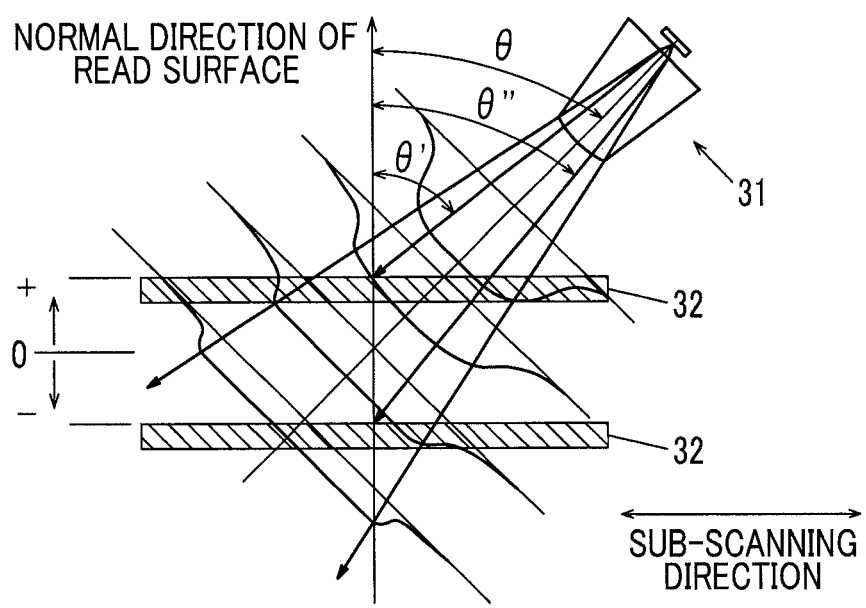

FIGS. 7A and 7B are explanatory views in a case where light beams are obliquely emitted from the illuminating device. Here, an assumption is made based on a case where the image carrier 32 is present at a position indicated by "0" in the drawing. In addition, an angle between a normal direction of a target point on a surface to be read of the image carrier 32 and a direction of the illuminating device 31 is set as θ, and a distance between the target point on the surface to be read of the image carrier 32 and a center of curvature of the light emission surface 12 of the illuminating device 31 is set as b. In a case where plural light sources 2 are arranged in such a manner that a light quantity distribution is not present in the longitudinal direction of the illuminating device 31, an illumination direction angle of the surface to be read direction with respect to optical axial direction of an illuminating system is set as φ. In a case where the target point on the surface to be read faces an illumination direction (θ=0), when illuminance of the target point on the surface to be read is set to I0=f(b, φ), illuminance I at the target point on the surface to be read of the image carrier 32 is expressed by an expression of I=I0×cosθ=f(b, φ)×cosθ. Here, the illuminating device 31 is substituted with a case where an ideal linear light source is present at a position of the center of curvature of the light emission surface 12 as the light source 2, and I0=K/b is satisfied without depending on the angle θ.

In FIGS. 7A and 7B, when a distance from an extended line of the normal line of the target point on the surface to be read to the center of curvature is set to a0, a0 does not vary in accordance with floating and falling of the surface to be read, and b satisfies an expression of b=a0/sinθ and becomes a variable depending on θ. Accordingly, an expression of I=K×cosθ×sinθ/a0=K×sin2θ/a0 is satisfied, and thus the illuminance is expressed by a function depending on θ. A value obtained by differentiating I with θ is proportional to cos2θ, and thus a changed portion ΔI of the illuminance I becomes 0 at θ=45° at which cos2θ becomes 0, and the illuminance variation disappears with respect to floating and falling of the surface to be read at this angle.

An illumination depth in the embodiment of the invention is calculated by using a specific actual amount. When calculating the illuminance variation with respect to a variation in floating and falling of the surface to be read, a relationship between d and θ, which indicates the depth of floating and falling in an actual surface to be read, becomes d×tanθ=a0, and thus an expression of Δd/d=−Δθ/(cosθ×sinθ) is established. From this relationship, when assuming the variation in the illumination depth with respect to Δd=±2 mm at b=25 mm and d=a=17.7 mm, θ corresponds to θ=±3.24°, and accuracy of −0.7% is obtained as the illuminance variation. This becomes a function of I=f(b, φ)×cosθ and the illumination direction angle φ in an actual illuminating device, and Δθ=Δφ is obtained from a relationship of FIGS. 7A and 7B. In a light quantity distribution which may be seen in an illuminating device of the related art and in which a bundle of light beams is focused in an optical axial direction of an illuminating system, when the angle ϕ toward the surface to be read from the center of curvature varies due to the floating and falling of the surface to be read, f(b, ϕ) greatly varies, and thus the illumination depth rapidly decreases. In a case where the cylindrical lens has characteristics in which convergence occurs with respect to the skew light beams, characteristics in which a bundle of light beams is condensed to the center of an illumination optical axis are obtained, and thus the illumination depth decreases. On the other hand, as the embodiment of the invention, when the characteristics of the cylindrical lens are set to characteristics in which convergence does not occur with respect to the skew light beams, a variation of f(b, ϕ) decreases with respect to a variation in $\Delta\phi=\Delta\theta=\pm 3°$ that is a variation of a spreading angle ϕ at the illumination optical axis in comparison to a case where a bundle of light beams is focused, and thus an illumination depth similar to an ideal linear light source is obtained.

Here, the illuminating device 31 has the arc-shaped light emission surface 12, and is configured in such a manner that light beams are emitted in a predetermined range from a normal direction of the light emission surface 12. From this configuration, light beams that are emitted from the illuminating device 31 are spread to a certain degree, and in this spreading range, light beams, in which angles θ of a irradiation surface with respect to a normal line are different from each other, are emitted.

FIG. 7B illustrates a case where a distance between the image carrier 32 and the illuminating device 31 varies. Here, in a case where the image carrier 32 is present at a position indicated by 0 as the standard, an angle between a normal direction at a reading position and a direction of the illuminating device 31 is set as θ. For example, when considering a case where the image carrier 32 varies in a normal direction of the surface to be read which is indicated by "+" in the drawing, the distance between the image carrier 32 and the illuminating device 31 becomes shorter than the distance at the position indicated by 0 as the standard. Accordingly, as illustrated in FIG. 6, the intensity of light beams becomes stronger than the intensity at the standard position.

On the other hand, an angle between the normal direction at the reading position of the image carrier 32 and the direction of the illuminating device 31 becomes θ'. The angle θ' is larger than the angle θ at the standard position. When the angle increases, the light quantity per unit area decreases. For example, when considering the sunlight, a light quantity in the evening, at which the angle with the normal direction is larger, is smaller than a light quantity in the daytime at which the angle with the normal direction is small. From this fact, the relationship in the light quantity also may be easily understood.

As described above, when the position of the image carrier 32 deviates from the standard position toward the "+" direction in the drawing, that is, toward a direction closer to the illuminating device 31, the intensity of light beams from the illuminating device 31 further increases in comparison to the standard position. However, the angle of light beams from the illuminating device 31 further increases in comparison to the standard position, and thus the light quantity per unit area decreases. Accordingly, the increase in the intensity of light beams and the decrease in the light quantity offset each other. In the characteristics of the above-described ideal linear light source case in the vicinity of θ=45°, an increment and a decrement offset each other, and thus the illuminance at a reading target point does not vary from the illuminance at the standard position. In addition, as described above, when the virtual image 21 of the light source 2 is set in a predetermined range including the center of curvature of the cylindrical lens 1, the convergence characteristics with respect to the skew light beams are reduced, and thus become closer to conditions of the ideal linear light source. Accordingly, even when the position of the image carrier 32 varies toward the "+" side, the illuminance at the reading target point becomes almost the same as the illuminance at the standard position of the image carrier 32.

In addition, for example, when considering a case where the image carrier 32 varies in a normal direction of the surface to be read which is indicated by "−" in the drawing, the distance between the image carrier 32 and the illuminating device 31 becomes longer than the distance at the position indicated by 0 as the standard. Accordingly, as illustrated in FIG. 6, the intensity of light beams becomes weaker than the intensity at the standard position. On the other hand, an angle between the normal direction at the reading target point of the image carrier 32 and the direction of the illuminating device 31 becomes θ". The angle θ" becomes smaller than the angle θ at the standard position. When the angle decreases, the light quantity per unit area increases.

As described above, when the position of the image carrier 32 deviates from the standard position toward the "−" direction in the drawing, that is, toward a direction spaced away from the illuminating device 31, the intensity of light beams from the illuminating device 31 further decreases in comparison to the standard position. However, the angle of light beams from the illuminating device 31 further increases in comparison to the standard position, and thus the light quantity per unit area increases. Accordingly, the decrease in the intensity of light beams and the increase in the light quantity offset each other. As described above, when the virtual image 21 of the light source 2 is set in a predetermined range including the center of curvature of the cylindrical lens 1, the convergence characteristics with respect to the skew light beams are reduced, and thus an increment and a decrement in the light quantity offset each other. Accordingly, even when the position of the image carrier 32 varies toward the "−" side, the illuminance at the reading target point becomes almost the same as the illuminance at the standard position.

In addition, for example, the angle between the normal direction of the surface to be read of the image carrier 32 at the standard position and the illuminating device 31 may be in a predetermined range including 45°.

Figure 8A:
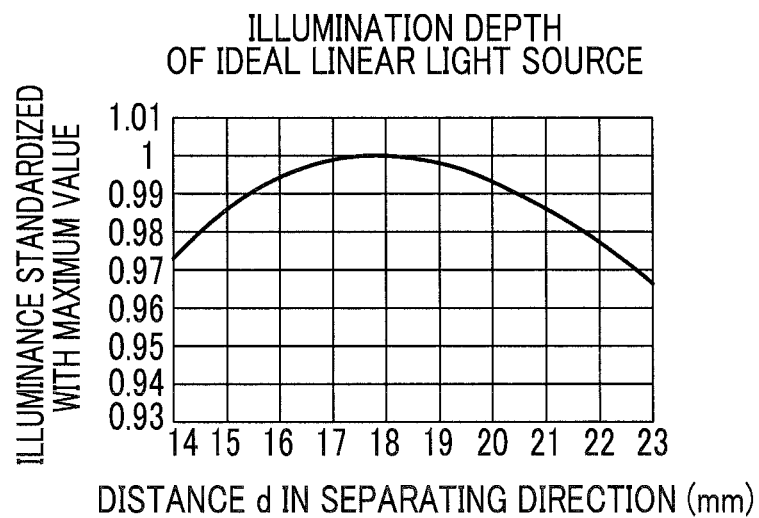
FIGS. 8A to 8C are explanatory views of an example of a relationship between illuminance, an illumination angle, and a distance in a separating direction.
Figure 8B:
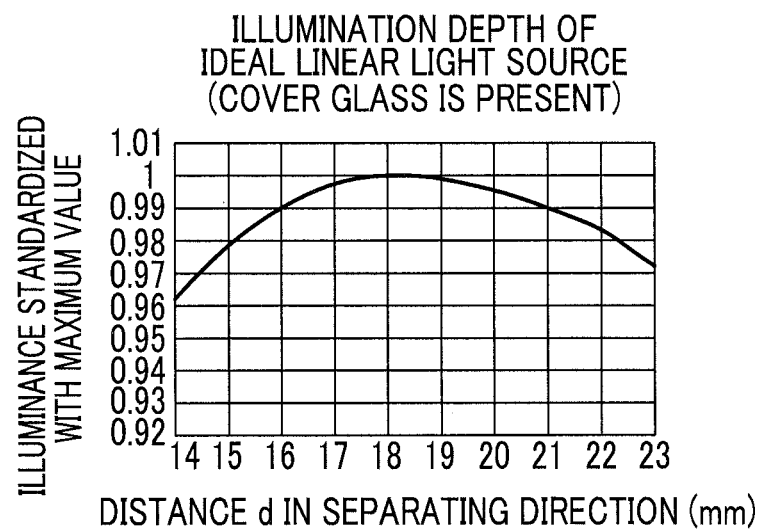
Figure 8C:
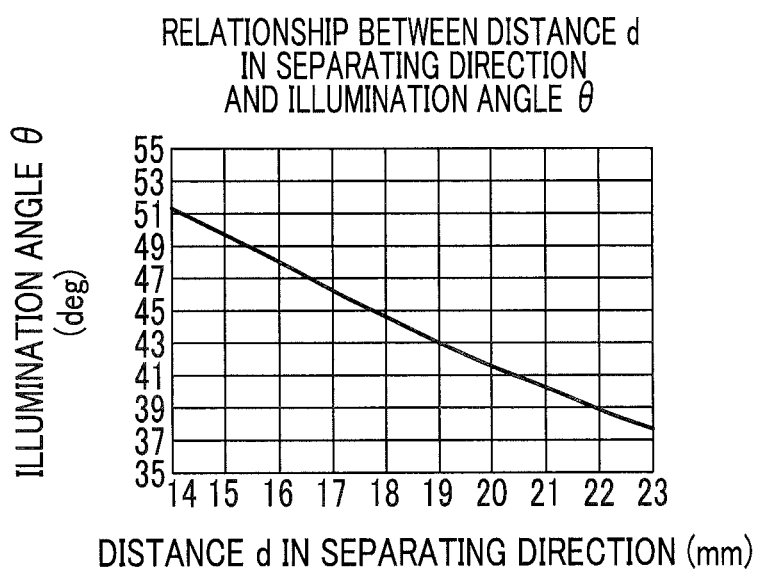

FIGS. 8A to 8C are explanatory views of an example of a relationship between illuminance, an illumination angle, and a distance in a separating direction. As an example of specifically setting the angle θ with respect to the normal line of the above-described surface to be illuminated (hereinafter, referred to as an illumination angle θ for simplification), FIG. 8A illustrates a relationship between the illuminance I and the distance d in the separating direction with a graph from a relationship between the illuminance $I=K\times\sin 2\theta/a0$ and $a0=d\times\tan\theta$. With respect to a case where a facing surface that presses an object to be illuminated is present to monitor a standard image forming output, the setting of the illumination angle θ will be described below by using the graph. In this case, a value of the distance d in the separating direction is not equal to or longer than a distance to the facing surface, and it is limited to a use at a distance that is shorter than the distance to the facing surface.

In this case, d corresponding to the facing surface is set to 20 mm which is longer than the 18 mm that is a distance in the separating direction at which the light quantity becomes a peak in FIG. 8A. When setting d in this manner, a range from 16 mm to 20 mm with the illuminance peak present therebetween is a use range in an illuminance variation range corresponding to a range from a peak illuminance to 99.3% of its peak. In this case, an illumination angle θ that corresponds to d=20 mm becomes θ=41° from a relationship between the distance d in the separating direction and the illumination angle θ which is shown in FIG. 8C.

In addition, when cover glass is inserted between an illuminating unit and an object to be illuminated, due to angle characteristics of a glass surface transmittance (when the illumination angle θ increases, the transmittance decreases due to an increase in surface reflection), as shown in FIG. 8B, the peak with respect to the distance d in the separating direction moves by approximately 1 mm, and illuminance variation characteristics on a side, at which the distance in the separating direction is lengthened, also vary to increase illuminance. In this case, when the illuminance variation is further permitted up to 2%, if the distance d in the separation direction, which corresponds to the facing surface is set to 22 mm, a range from 15 mm to 22 mm with the illuminance peak present therebetween becomes a using range in a range corresponding to a range from a peak illuminance to 98% of its peak. In this case, the illumination angle θ, which corresponds to a distance of d=22 mm in the separating direction, becomes 39° in FIG. 8C.

In addition, in a case where the glass surface becomes close to the object to be illuminated, illumination light beams, which hit against the object to be illuminated, may be reflected from the glass surface and may be incident again to the object to be illuminated in some cases. In this case, the illumination angle may be set to include an increase in illuminance by approximately 2% when becoming close to the glass surface.

In a use in which an object to be illuminated is placed on platen glass and reading is performed, the distance in the separating direction varies to be longer than the minimum value of a distance in the separating direction which is determined at a position of the platen glass. In this case, a standard of the distance d in the separating direction is set to 15 mm by assuming an increment of 2% in a light quantity due to the glass surface reflection to offset illumination depth characteristics and an effect of the glass surface reflection. 15 mm in this case corresponds to an illumination angle of 50°.

Figure 9:
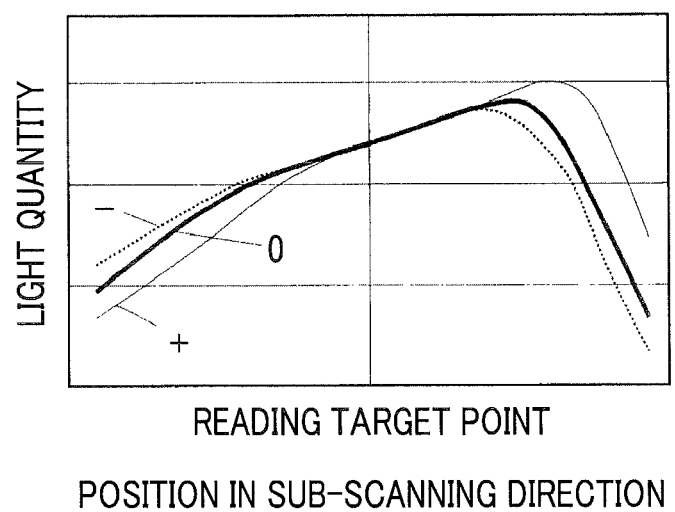
FIG. 9 is an explanatory view of an example of a relationship between a position in a sub-scanning direction and a light quantity in an illuminating device in which a virtual image of a light source is set in a predetermined range including the center of curvature of a cylindrical lens, thereby reducing convergence characteristics with respect to skew light beams.

FIG. 9 is an explanatory view of an example of a relationship between a position in a sub-scanning direction and the light quantity in the illuminating device 31 in which the virtual image 21 of the light source 2 is set in a predetermined range including the center of curvature of the cylindrical lens 1, thereby reducing convergence characteristics with respect to the skew light beams. Here, this example is based on results obtained by performing a light quantity simulation in a case of using an LED array, in which a white LED having a light emitting surface diameter of 2.4 mm is disposed with an interval of 6 mm, as the light source 2 instead of the ideal linear light source. The depth characteristics slightly decrease in comparison to a case of the ideal linear light source, but approximately the same characteristics as the ideal linear light source are obtained. FIG. 7A illustrates the variation in the position and the light quantity on the image carrier 32 in a direction indicated by the sub-scanning direction, and FIG. 7B illustrates three different cases in which the distance between the illuminating device 31 and the image carrier 32 varies in the direction indicated by "0", "+", and "−". In addition, the position which is indicated by "0" in the sub-scanning direction becomes the reading target point. From FIG. 9, it may be seen that even when the distance between the image carrier 32 and the illuminating device 31 varies at the reading target point, the light quantity does not vary. Accordingly, even when a distance from the illuminating device 31 varies in cases such as a case where floating occurs during movement of the image carrier 32 and a case where unevenness occurs on the image carrier 32, a variation in the intensity of illumination light beams is suppressed.

In addition, in the embodiment of the above-described illuminating device, even when the aberration with respect to skew light beams of the cylindrical lens 1 is present, convergence of light beams, which are radiated from the light sources 2 in the longitudinal direction of the cylindrical lens 1, is avoided. In addition, the illumination light quantity slightly varies due to a variation in the distance between the image carrier 32 and the illuminating device 31, which is caused by an effect of the convergence due to the aberration. However, the convergence due to the skew light beams is reduced, and thus a variation in the intensity of the illumination light beams due to the variation in the distance between the image carrier 32 and the illuminating device 31 is suppressed.

In addition, from FIG. 9, it may be seen that even when the reading position deviates in the sub-scanning direction, the variation in the light quantity due to the variation in the distance between the illuminating device 31 and the image carrier 32 does not occur. Accordingly, in the embodiment of the image reading apparatus, even when the reading position deviates in the sub-scanning direction, in an error range in which the deviation is permitted, reading is performed without variation in the illumination light quantity due to the variation in the distance between the illuminating device 31 and the image carrier 32.

The permissible deviation in the reading position depends on a radius of curvature of the light emission surface 12 in the illuminating device 31. As the radius of curvature decreases, the permissible range of the reading position becomes narrower, and a variation amount of a distance at which the illumination light quantity is maintained decreases in combination with the deviation in the reading position.

Figure 11A:
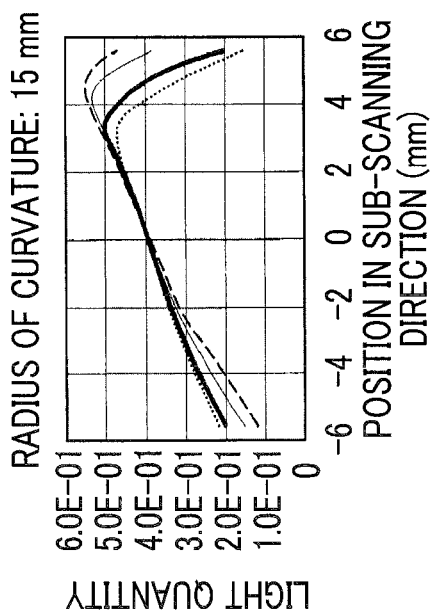
FIGS. 11A to 11D are explanatory views (continued) of the specific example of the variation in characteristics due to the variation in the radius of curvature of the light emission surface.
Figure 11C:
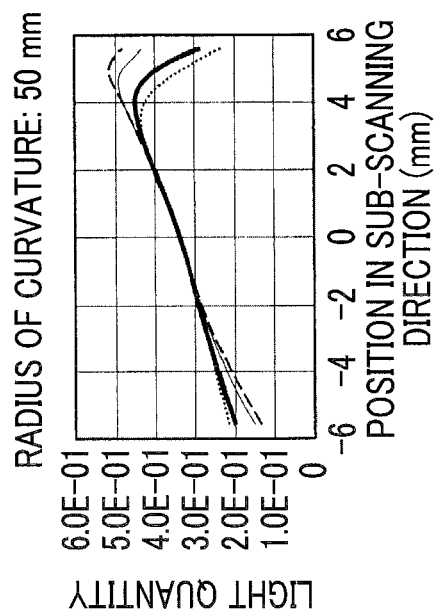
Figure 11B:
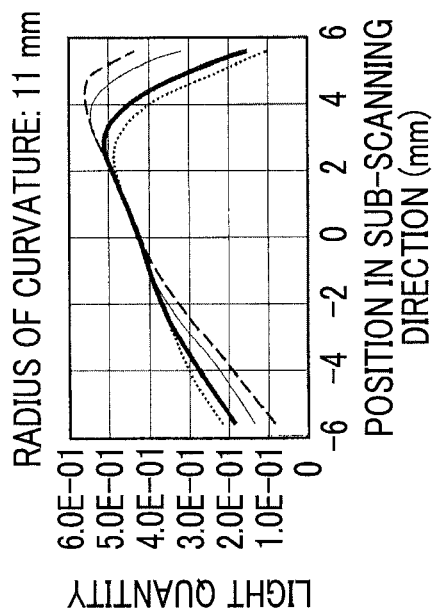
Figure 11D:
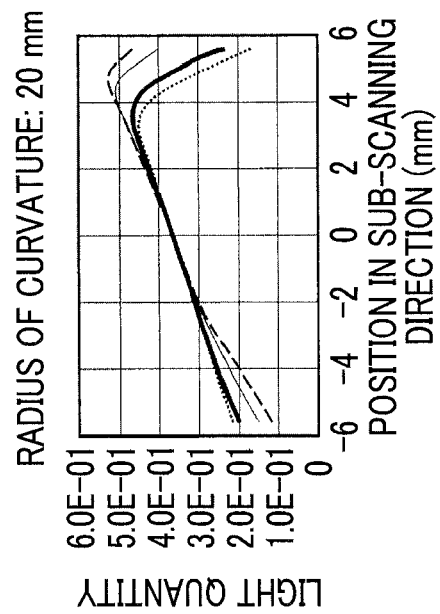

FIGS. 10A to 11D are explanatory views of a specific example of a variation in characteristics due to a variation in the radius of curvature of the light emission surface. Here, the light source 2, a position of the light incidence surface 11, and a position of the light emission surface 12 are fixed based on optimal conditions in which the thickness of the cylindrical lens 1 is set with respect to the radius of curvature of 10 mm in order for the position of the virtual image 21 due to the light incidence surface 11 to be the center of curvature of the light emission surface 12 when setting a distance between the light incidence surface and the light source to 1.1 mm. Under these conditions, FIGS. 10A to 10D illustrate a specific example of a variation in characteristics in a case where the radius of curvature of the light emission surface 12 is set to sequentially deviate from 10 mm toward a smaller side. FIG. 10A illustrates a case where the radius of curvature is 10 mm, FIG. 10B illustrates a case where the radius of curvature is 8 mm, FIG. 10C illustrates a case where the radius of curvature is 7 mm, and FIG. 10D illustrates a case where the radius of curvature is 5 mm. In addition, FIGS. 11A to 11D illustrate a specific example of a variation in characteristics in a case where the radius of curvature of the light emission surface 12 is set to sequentially deviate from 10 mm toward a larger side under the above-described conditions. FIG. 11A illustrates a case where the radius of curvature is 11 mm, FIG. 11B illustrates a case where the radius of curvature is 15 mm, FIG. 11C illustrates a case where the radius of curvature is 20 mm, and FIG. 11D illustrates a case where the radius of curvature is 50 mm. In addition, respective curves in respective graphs indicate a variation in characteristics in a case where the distance between the illuminating device 31 and the image carrier 32 varies in the direction indicated by "0", "+", and "−" in FIG. 7B due to floating and falling of the image carrier 32. A bold line indicates a case of ±0 mm, a dotted line indicates a case of −0.5 mm, a thin line indicates a case of +1.0 mm, and a broken line indicates a case of ±1.5 mm.

In the graphs illustrating an illuminance distribution in the sub-scanning direction, at a position near to 0 mm in the sub-scanning direction, characteristics show an inclined straight-line tendency in a region in which the radius of curvature is large. In contrast, as the radius of curvature decreases, at the position near to 0 mm in the sub-scanning direction in the graph, the characteristics gradually show a curved-line tendency by illuminance in the sub-scanning direction. In addition, a range, in which the respective curves overlap each other and a common illumination depth may be obtained even when floating and falling of the image carrier 32 occur, becomes narrower.

Figure 12A:
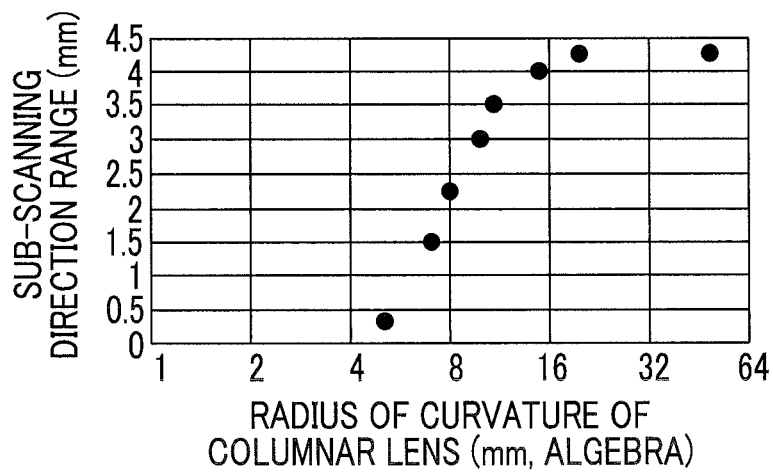
FIGS. 12A and 12B are explanatory views of a specific example of a relationship between the radius of curvature of the light emission surface, a sub-scanning direction range, and illuminance of a sub-scanning central portion.
Figure 12B:
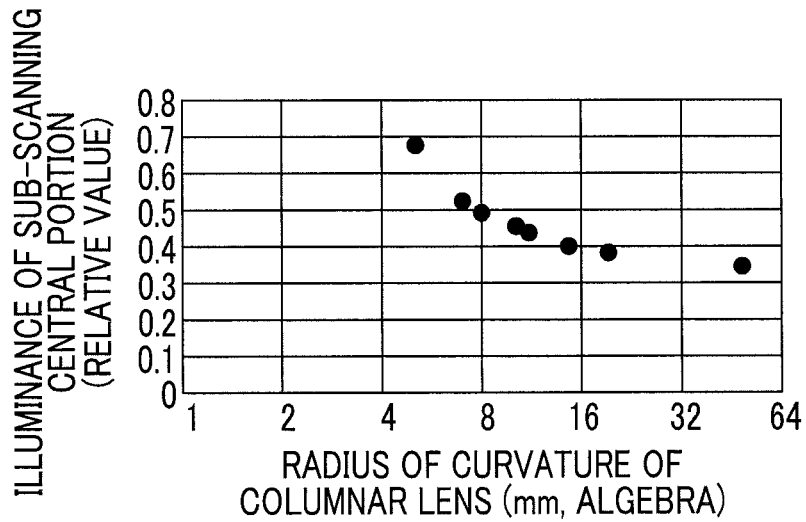

FIG. 12A is an explanatory view of a specific example of a relationship between the radius of curvature of the light emission surface 12 and a sub-scanning direction range. FIG. 12B is an explanatory view of a specific example of a relationship between the radius of curvature of the light emission surface 12 and illuminance of a sub-scanning central portion. From the above-described characteristics, FIG. 12A is a graph showing the sub-scanning direction positional range, in which a variation in the light quantity at respective positions in the sub-scanning direction is in 4% under respective conditions of the radius of curvature, with a length. It may be seen that the sub-scanning direction positional range in which the variation in the light quantity is in 4% becomes narrower, as the radius of curvature decreases from conditions in which the center of curvature of the light emission surface 12 is set to the position of the virtual image 21 of the light incidence surface 11.

On the other hand, FIG. 12B illustrates an example of comparing the illuminance obtained from FIGS. 10A to 10D and the illuminance obtained from FIGS. 11A to 11D at the sub-scanning direction position of 0 mm. As the radius of curvature of the light emission surface 12 decreases, the degree of convergence of a bundle of light beams increases, and thus the illuminance increases.

From the characteristics of the illuminance and a variation in illumination in a depth direction (illumination depth), curvature conditions may be changed from a basic configuration in which the position of the virtual image 21 of the light source 2 due to the light incidence surface 11 is set to the position of the center of curvature of the light emission surface 12 in accordance with a design in which priority is given to either accuracy of the illumination depth or central illuminance.

Figure 13A:
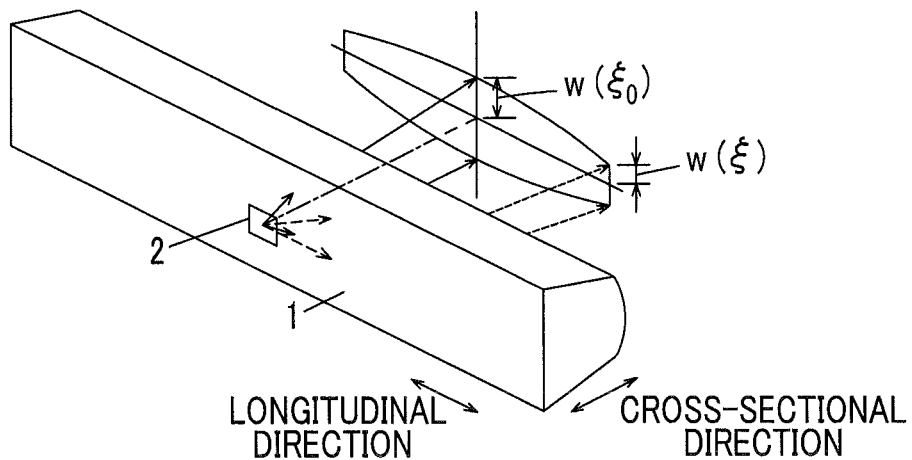
FIGS. 13A to 13C are explanatory views of an example of skew light beams in the embodiment of the illuminating device of the invention.
Figure 13B:
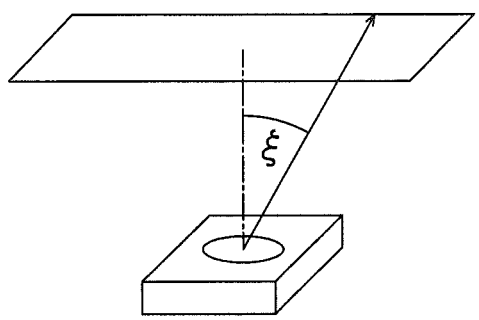
Figure 13C:
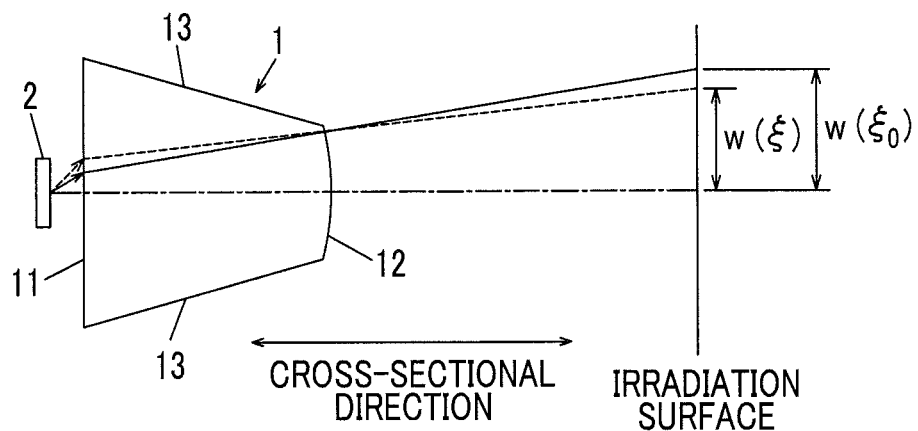

FIGS. 13A to 13C are explanatory views of an example of skew light beams in the embodiment of the illuminating device of the invention. Here, an examination of a behavior of skew light beams will be made with respect to a case where a positional relationship between the center of curvature of the light emission surface 12 and the virtual image 21 of a light source 2 due to the light incidence surface 11 is changed. In FIG. 13A, an attention is given to one of plural light sources 2, and FIGS. 13A to 13C show a bundle of emission light beams when light beams, which are emitted from the center of the light source 2 and are transmitted through an effective opening of a light guide due to the cylindrical lens 1, are emitted to an irradiation surface. A width in a vertical direction of the bundle of emission light beams in the drawing varies due to the characteristics with respect to skew light beams.

A width of an end of the bundle of light beams in the vertical direction of the drawing, which determines a projection shape of the bundle of light beams that are emitted, will be determined with respect to an emission angle of the light source 2 to be described later. A polar angle $\xi$ of a three-dimensional polar coordinate of light beams, to which attention is given, with respect to an emission optical axis of the light source 2 shown in FIG. 13B is set as an emission angle from the light source 2. Light beams that are emitted from the light source 2 at the emission angle $\xi$ become a light beam group that constitutes a side surface of a light cone. At a position at which among the light beam groups, light beams, which are refracted at the incidence surface and are transmitted through an effective emission end of the light emission surface, collide with an irradiation surface, a width of the bundle of emission light beam $w(\xi)$ with respect to the emission angle $\xi$, which is shown in FIG. 13C, is determined.

Figure 14:
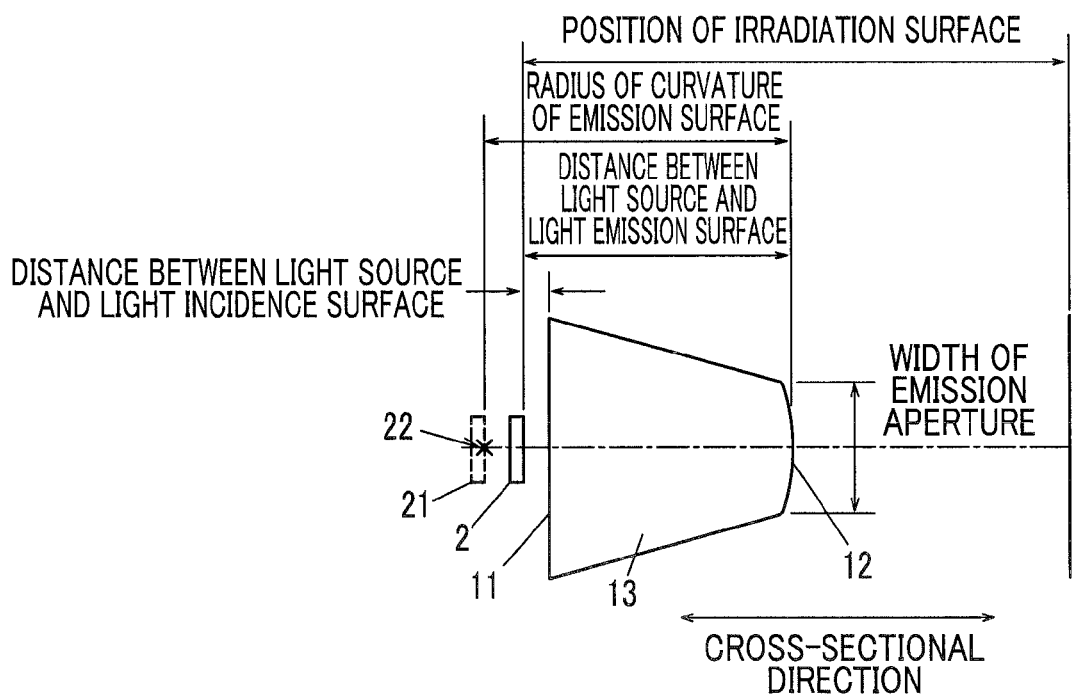
FIG. 14 is an explanatory view of respective dimensions of the illuminating device in the embodiment of the invention.
Figure 15:
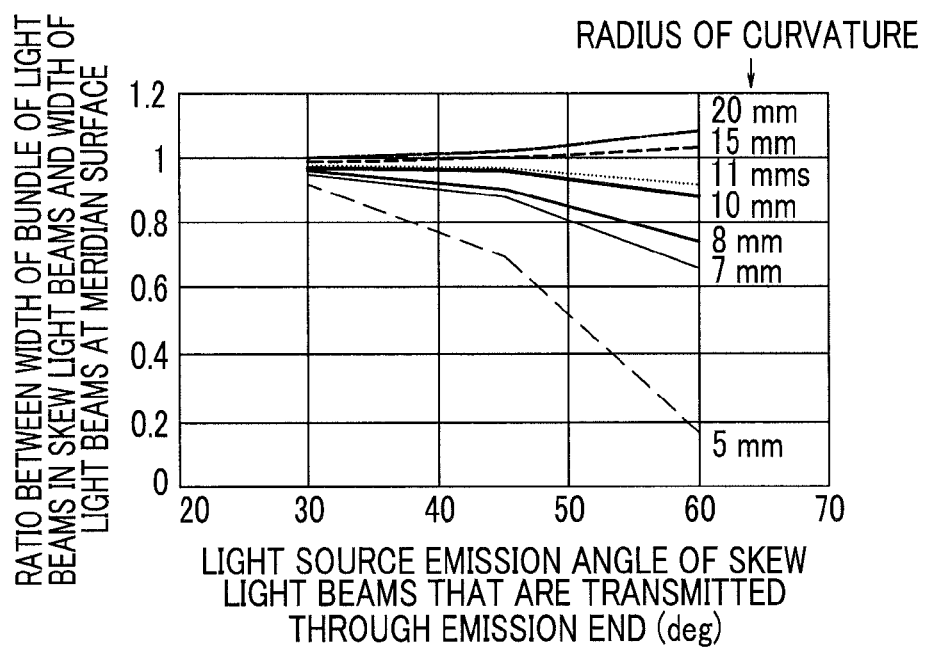
FIG. 15 is an explanatory view of an example of a degree of convergence of a bundle of skew light beams due to a radius of curvature.
Figure 16:
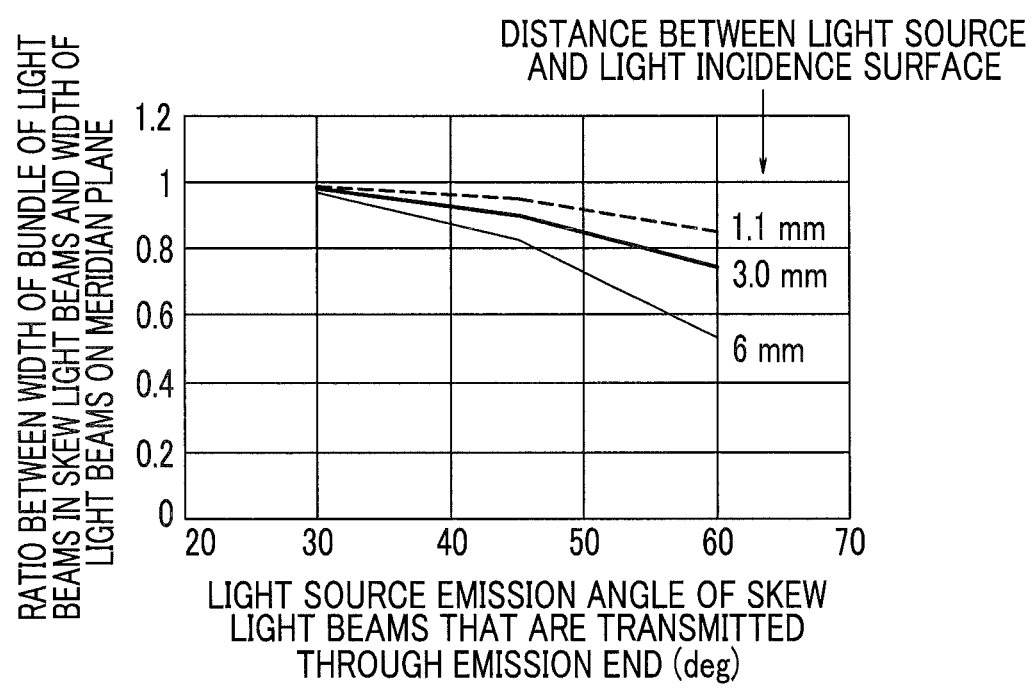
FIG. 16 is an explanatory view of an example of the degree of convergence of the bundle of skew light beams due to a distance between a light source and a light incidence surface.

FIG. 14 is an explanatory view of respective dimensions of the illuminating device in the embodiment of the invention, FIG. 15 is an explanatory view of an example of a degree of convergence of a bundle of skew light beams due to a radius of curvature, and FIG. 16 is an explanatory view of an example of the degree of convergence of the bundle of skew light beams due to a distance between the light source and the light incidence surface. FIG. 15 illustrates an example of a variation in the width of the bundle of emission light beam $w(\xi)$ with respect to the emission angle $\xi$ in a case of changing the radius of curvature of the light emission surface 12. Here, a plane which is perpendicular to the longitudinal axis of the cylindrical lens and which includes the center of the light source is called a meridian plane, and a ratio of the width of the bundle of emission light beam $w(\xi)$ at the emission angle $\xi$ to a width of the bundle of emission light beam $w(\xi 0)$ on the meridian plane is shown at the vertical axis as $w(\xi)/w(\xi 0)$. The width of the bundle of emission light beam $w(\xi 0)$ on the meridian plane is also shown in FIGS. 13A to 13C.

In a case where the position of the virtual image of the light source at the incidence surface 11 is set to a position of the center of curvature when setting the radius of curvature of the light emission surface to 10 mm, and the radius of curvature is sequentially made to be small from the ideal conditions, a tendency in which the ratio of the width of the bundle of emission light beams decrease becomes strong due to the emission angle $\xi$. Dimensions such as an aperture width are shown in FIG. 14. Here, the aperture width is set to 4 mm.

A comparison will be made based on the emission angle of $\xi=60°$ at which the light quantity becomes a half in a case of setting directional characteristics of the light source 2 with respect to the emission angle to a standard Lambert distribution. In a case of setting the radius of curvature of the light emission surface to 5 mm that is ½ times the distance from a position of a paraxial virtual image of the light source to the light emission surface while setting the position of the paraxial virtual image of the light source at the light incidence surface to the position of the center of curvature when the radius of curvature of the light emission surface is 10 mm, a width ratio of a bundle of emission light beams at an emission angle of 60° becomes ⅕ or less, and thus light beams tend to be condensed at a Lambert angle of 60°. In a case where the radius of curvature is made to be smaller than 10 mm, and thus a degree of convergence increases with increase in the emission angle, a percentage of a bundle of light beams, which is collected to an optical axis of the light source 2 after emission light beams from the light source 2 are transmitted through the cylindrical lens 1, increases. This corresponds to a case in which a distribution in the sub-scanning direction varies and thus at the position near to 0 mm in the sub-scanning direction, the illuminance distribution shows a curved-line tendency similar to FIG. 10D and the like.

A relationship of the width ratio $w(\xi)/w(\xi 0)$ of the bundle of emission light beams will be examined based on conditions of the position of the incidence surface. In a case where the position of the virtual image of the light source is determined by using paraxial approximation in geometrical optics on the assumption that Snell's law relating to refraction of light beams, that is, $n \times \sin\xi = n' \times \sin\xi$ is approximated to $n \times \xi = n' \times \xi'$, when a light source emission angle $\xi$ increases to a Lambert angle, a deviation occurs from the approximation. Accordingly, even when the position (a value of the paraxial approximation) of the virtual image of the light source at the incidence surface is set to the center of the curvature of the light emission surface, an emission point (a position of the virtual image at the emission angle $\xi$) on an optical axis of the light source, which is obtained by backlight-tracking light beams after being refracted at the light incidence surface 11, deviates from the position of the paraxial virtual image in a direction to be spaced away from the light incidence surface 11, and thus a degree of convergence of the bundle of light beams after emission from the light emission surface with respect to skew light beams becomes stronger than that of a bundle of light beams on the meridian plane.

However, error due to the deviation in the position of the virtual image from the paraxial approximation is proportional to a distance from the light incidence surface 11 to the light source 2. The smaller the distance from the light source 2 to the light incidence surface 11 is, the shorter the distance to be spaced away from the light incidence surface 11 is. In addition, the larger the distance from the light incidence surface 11 to the light source 2 is, the longer the distance to be spaced away from the light incidence surface 11.

In a case of changing the distance between the light source and the light incidence surface under conditions in which the position of the paraxial virtual image due to the light incidence surface 11 becomes the center of curvature of the light emission surface, a relational variation in the ratio $w(\xi)/w(\xi 0)$ of the bundle of emission light beams with respect to the emission angle $\xi$ is shown in FIG. 16 as an effect of error from the paraxial approximation. When the distance between the light source and the light incidence surface is approximately 1.1 mm, a deviation between the position of the paraxial virtual image and the position of the virtual image with respect to the emission angle $\xi$ is smaller in comparison to a case the distance is longer than the approximately 1.1 mm. When the distance between the light source and the light incidence surface is set to 6 mm that corresponds to 60% (⅗) of the radius of curvature, in a case of deviating from the radius of curvature shown in FIG. 15, characteristics corresponding to a case where the radius of curvature is set to 7 mm or less are obtained.

A configuration in which the radius of curvature is designed to be smaller and a configuration in which the distance between the light source and the light incidence surface is set to be longer have the same effect on the illumination depth characteristics. However, in a case where the distance between the light source and the light incidence surface is set to be longer under conditions in which the position of the paraxial virtual image at the light incidence surface is set to the center of the curvature of the light emission surface, the illumination light quantity relatively decreases by a degree corresponding to the bundle of light beams on the meridian plane that are not converged. Accordingly, from the trade-off viewpoint between the illumination depth characteristics and the illumination light quantity, the distance between the light source and the light incidence surface may be made to be small in a mechanical restriction range such as a tolerance of respective portions.

Figure 17A:
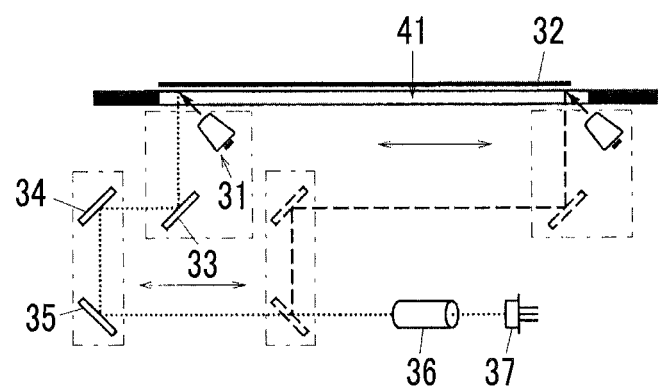
FIGS. 17A and 17B are configuration views illustrating another embodiment of the image reading apparatus of the invention.
Figure 17B:
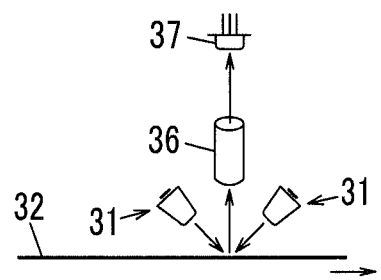

FIGS. 17A and 17B are configuration views illustrating another embodiment of the image reading apparatus of the invention. In the drawings, a reference numeral 41 indicates an opening. In the configuration illustrated in FIG. 5, reading is performed while moving the image carrier 32. However, various reading methods may be employed without limitation to the configuration as long as the reading apparatus uses the illuminating device described in the embodiment of the illuminating device.

As an example, in an example illustrated in FIG. 17A, a configuration in which reading is performed while moving the illuminating device 31, and the reflecting mirrors 33, 34, and 35 without moving the image carrier 32 is illustrated. In this configuration, the image carrier 32 is mounted on a mounting surface provided in the opening 41, and the image carrier 32 is illuminated by the illuminating device 31 through the opening 41. Reflected lights from the image carrier 32 are received by the light receiving unit 37 through the reflecting mirrors 33, 34, and 35, and the optical unit 36 to read an image. The reading may be performed while moving the illuminating device 31 and the reflecting mirror 33, and while moving the reflecting mirror 34 and the reflecting mirror 35 at a velocity ½ times the velocity of the illuminating device 31 and the reflecting mirror 33. There is also known a configuration which is used in combination with a reading method in which image is read while moving the image carrier 32, and this configuration may also be employed.

In an example illustrated in FIG. 17B, an example of a configuration in which the reflecting mirrors 33, 34, and 35 are not used is illustrated. In the example of this configuration, reading is performed while moving the image carrier 32. The image carrier 32 may be illuminated by the illuminating device 31, and reflected lights from the image carrier 32 may be received by the light receiving unit 37 through the optical unit 36 to read an image.

It is needless to say that other reading methods may be employed. When the illumination is obliquely performed by using the illuminating device described in the embodiment of the illuminating device of the invention as the illuminating device 31 in accordance with conditions, even when a read surface of the image carrier 32 varies in a normal direction of the read surface, illuminance of the read surface is maintained, and thus the illumination depth is secured.

Figure 18:
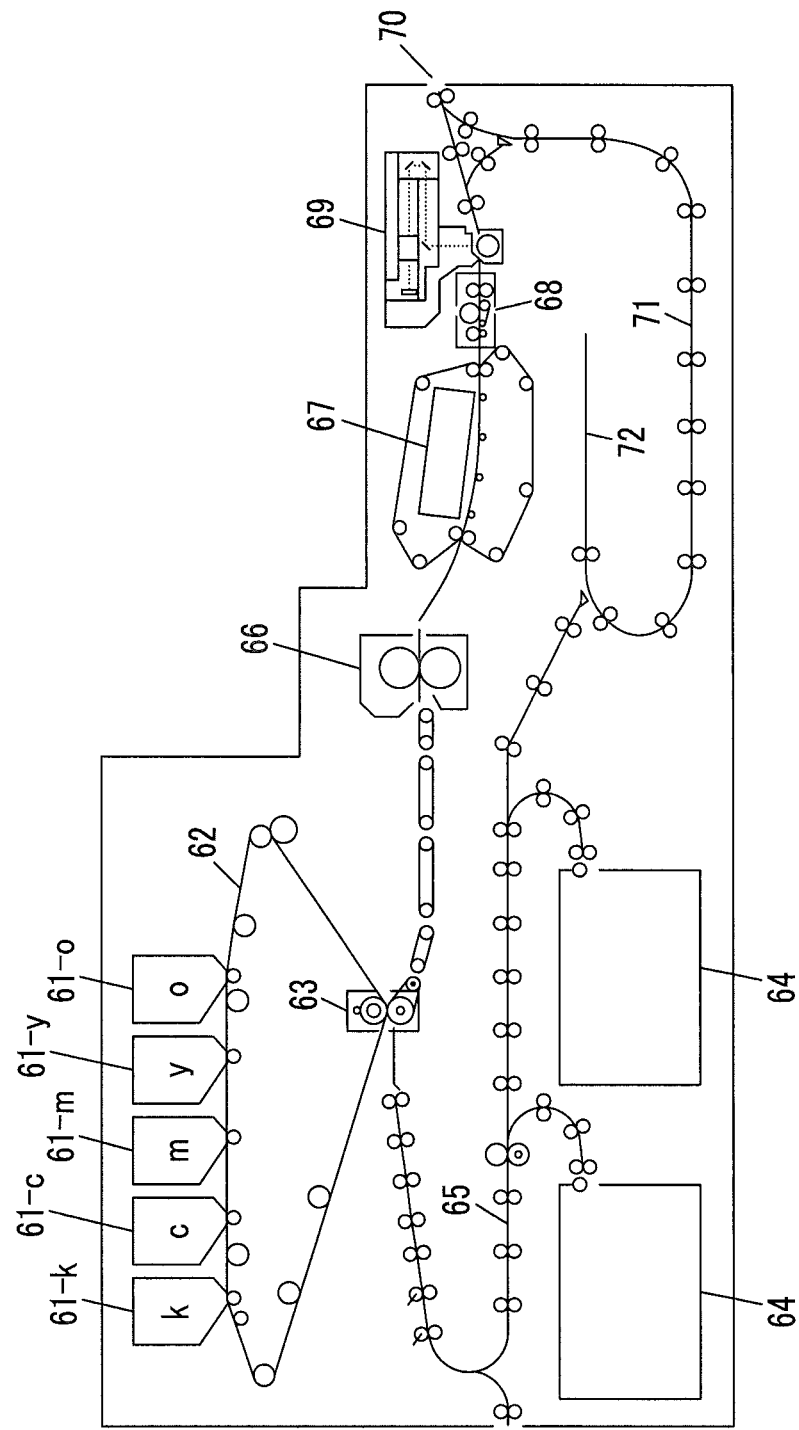
FIG. 18 is a configuration view illustrating an application example of the image reading apparatus of the invention.

FIG. 18 is a configuration view illustrating an application example of the image reading apparatus of the invention. In the drawing, reference numerals 61-*k*, 61-*c*, 61-*m*, 61-*y*, and 61-*o* indicates an image forming unit, a reference numeral 62 indicates an intermediate transfer body, a reference numeral 63 indicates a secondary transfer unit, a reference numeral 64 indicates a paper supplying tray, a reference numeral 65 indicates a transport path, a reference numeral 66 indicates a fixing unit, a reference numeral 67 indicates a cooling unit, a reference numeral 68 indicates a decurler, a reference numeral 69 indicates a reading unit, a reference numeral 70 indicates a discharging unit, a reference numeral 71 indicates a reversing path, and a reference numeral 72 indicates a turning path. Here, as an application example of each embodiment of the image reading apparatus of the invention, an example of configuration embedded in the image forming apparatus is illustrated. In this configuration, the image reading apparatus is used to understand the state of the image forming apparatus by reading an image formed in the image forming apparatus.

Each of the image forming units 61-k, 61-c, 61-m, 61-y, and 61-o forms an image on the intermediate transfer body 62 by using each of color material for K: black, C: cyan, M: magenta, Y: yellow, and o: gloss. The respective image forming units 61-k, 61-c, 61-m, 61-y, and 61-o includes a photosensitive drum that is constituted by a dielectric substance having a photosensitive surface, and a charger, an exposure, a developer, a primary transfer unit, a cleaning unit, and the like which are disposed at the periphery of the photosensitive drum. In addition, an accommodation container that accommodates each of the color materials, and the like are provided.

The intermediate transfer body 62 is a circular member that passes through the primary transfer unit of each of the image forming units 61-k, 61-c, 61-m, 61-y, and 61-o, and the secondary transfer unit 63. The intermediate transfer body 62 is also provided with a drive roll as an example of a drive member, a tension roll as an example of a tension applying member, a working roll as an example of a meandering prevention member, plural idler rolls as an example of a driven member, plural retract rolls as an example of a movable member, and the like, and thus the operation of the intermediate transfer body 62 is regulated. In addition, a cleaning unit of the intermediate transfer body 62, and the like is also disposed.

A recording medium is accommodated in the paper supplying tray 64. In this example, two paper supplying trays are provided. The recording medium is supplied from the paper supplying tray 64 to the transport path 65, and the recording medium is transported along the transport path 65. In the transport path 65, a burr removing unit that removes burr, and a detection unit that detects an overlapping state of the recording medium, that is, so-called multi-feeding by measuring the thickness of the recording medium that passes through the detection unit. In addition, a correction roll that corrects inclination with respect to a transporting direction of the recording medium, that is, so-called skew, a registration roll that adjusts a transporting time of the recording medium to the secondary transfer unit 63, and the like may be disposed in some cases.

In addition, in the transport path 65, the secondary transfer unit 63 is disposed. An image that is formed on the intermediate transfer body 62 is transferred to the recording medium, and thus the image is formed on the recording medium. The recording medium on which the image is formed is further transported along the transport path 65, and is transported to the fixing unit 66. In the fixing unit 66, the color material is melted through heating, and the color material is fixed to the recording medium through compression. In addition, in this example, the cooling unit 67 is provided to cool the recording medium that is heated by the fixing unit 66.

In addition, the decurler 68 that applies a pressure to the recording medium to correct bending of the recording medium, that is, so-called curling is disposed on a downstream side of the cooling unit 67. In addition, the reading unit 69 that reads the image recorded on the recording medium is disposed on a downstream side of the decurler 68.

The recording medium, which has passed through the reading unit 69, is discharged from the discharging unit 70. Alternatively, the recording medium passes through the reversing path 71, two sides of the recording medium are inverted at the turning path 72, the recording medium is transported to the transport path 65, and an image is formed on an opposite surface of the recording medium in some cases.

When forming an image in the image forming apparatus having the above-described configuration, the photosensitive drum of each of the image forming units 61-k, 61-c, 61-m, 61-y, and 61-o, or the intermediate transfer body 62 rotates, and in combination with the rotation, charging to the photosensitive drum by the charger, recording of an electrostatic latent image with irradiation of laser light beams by the exposure, development of the latent image with a color material by the developer, transferring of the developed image to the intermediate transfer body 62 by the primary transfer unit, cleaning by the cleaning unit, and the like are performed. Images are transferred to the intermediate transfer body 62 from the respective image forming units 61-o, 61-y, 61-m, 61-c, and 61-k in the order of O, Y, M, C, and K, and the images are stacked.

On the other hand, the recording medium is taken out sheet by sheet from the paper supplying tray 64, and is transported to the transport path 65. Removal of burr by the burr removing unit, detection of multi-feeding by the detection unit, correction of skew by the correction roll, adjustment of a transporting time by the registration roll, and the like are performed, and then the recording medium is transported to the secondary transfer unit 63.

When the recording medium is transported to the secondary transfer unit 63, the image formed on the intermediate transfer body 62 is transferred to the recording medium at each of the image forming units 61-k, 61-c, 61-m, 61-y, and 61-o. In addition, the intermediate transfer body 62 after transfer is cleaned and is used again for formation of an image by each of the image forming units 61-k, 61-c, 61-m, 61-y, and 61-o.

The recording medium to which the image is transferred is heated and compressed by the fixing unit 66, and thus the image is fixed to the recording medium. In addition, the recording medium that is heated by the fixing unit 66 is cooled by the cooling unit 67. After cooling, a pressure is applied to the recording medium by the decurler 68 to remove bending of the recording medium, that is, so-called curling, and then the recording medium is transported to the reading unit 69. The image formed on the recording medium is read by the reading unit 69. In addition, the recording medium on which the image is formed is discharged from the discharging unit 70. Alternatively, the recording medium is transported through the reversing path 71 and the turning path 72 to invert two sides of the recording medium, and is provided for formation of an image on an opposite surface.

Figure 19A:
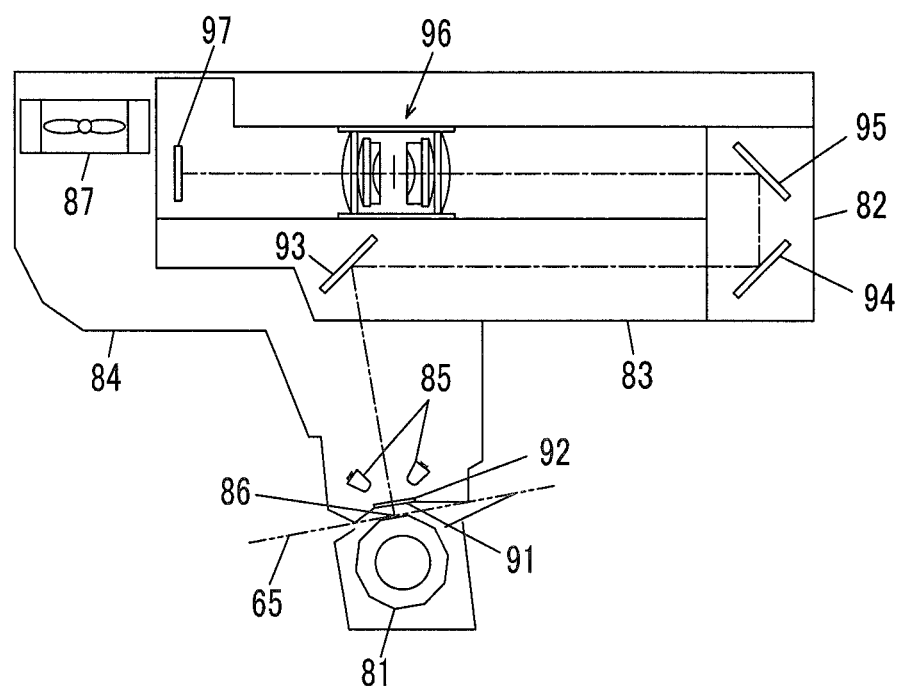
FIGS. 19A and 19B are configuration views of an example of a reading unit in the application example of the image reading apparatus of the invention.
Figure 19B:
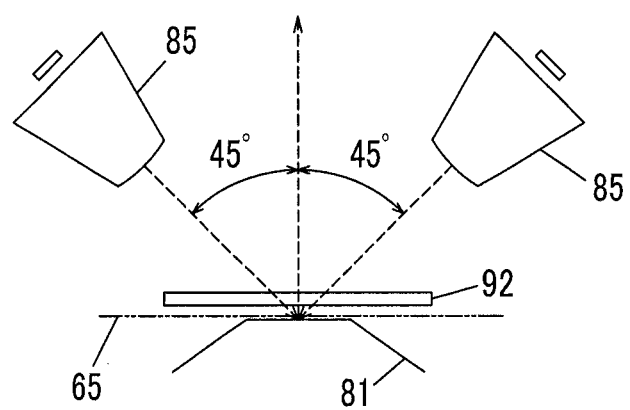
Figure 20:
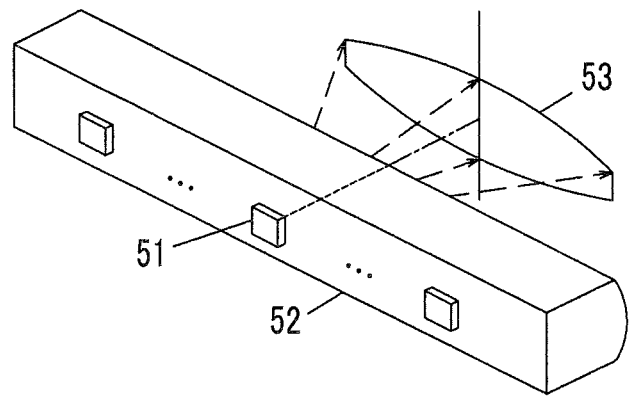
FIG. 20 is an explanatory view of an example of an illuminating device in the related art.

FIGS. 19A and 19B are configuration views of an example of the reading unit in an application example of the image reading apparatus of the invention. FIG. 19A is an enlarged view of main portions of the reading unit, and FIG. 19B is an enlarged view of main portions of the reading position. In the drawings, a reference numeral 81 indicates a standard roll, a reference numeral 82 indicates a reading unit main body, a reference numeral 83 indicates an optical system accommodating unit, a reference numeral 84 indicates an irradiation system accommodating unit, a reference numeral 85 indicates an illuminating unit, a reference numeral 86 indicates a reading position, a reference numeral 87 indicates a fan, a reference numeral 91 indicates an opening, a reference numeral 92 indicates a window member, a reference numeral 93 indicates a first mirror, a reference numeral 94 indicates a second mirror, a reference numeral 95 indicates a third mirror, a reference numeral 96 indicates a image formation unit, and a reference numeral 97 indicates a light receiving unit.

The reading unit 69 is the same as described in the embodiment of the image reading apparatus of the invention, and a basic reading method is shown in FIG. 5. The standard roll 81 that comes into contact with a lower surface of the recording medium transported through the transport path 65 is provided, and the reading unit main body 82 is disposed with the transport path 65 interposed between the standard roll 81 and the reading unit main body 82. The reading unit main body 82 includes the box-shaped optical system accommodating unit that extends in a transporting direction and a width direction of the recording medium, and the irradiating system accommodating unit 84 that is interposed between the optical system accommodating unit 83 and the transport path 65.

In the irradiating system accommodating unit 84, the illuminating unit 85 that is described as the embodiment of the illuminating device of the invention is disposed. The illuminating unit 85 irradiates the reading position 86, which is set in advance on the transport path 65, with illumination light beams. A structure and disposition of the illuminating unit 85 are the same as described above. In this example, the illuminating unit 85 is disposed one by one at a position making an angle of 45° with the normal direction of the recording medium. In addition, the fan 87 that cools the illuminating unit 85 is provided to the irradiating system accommodating unit 84.

In addition, in the irradiating system accommodating unit 84, the opening 91 is formed at a position facing the reading position 6, and the transparent window member 92 through which reflected lights from the recording medium are transmitted is provided in the opening 91.

The first mirror 93, the second mirror 94, and the third mirror 95 are provided to the optical system accommodating unit 83. The first mirror 93 reflects reflected lights from the recording medium that are transmitted through the window member 92 toward the second mirror 94. In addition, the second mirror 94 reflects the light beams reflected from the first mirror 93 toward the third mirror 95. In addition, the third mirror 95 reflects the light beams reflected from the second mirror 94 toward the light receiving unit 97.

The light beams reflected from the third mirror 95 are incident to the image formation unit 96 through a light shielding plate that shields disturbance or diffusely reflected lights. The image formation unit 96 is provided with an imaging lens group constituted by plural lenses, a filter that shields infrared light beams, and the like. Light beams that are condensed at the image formation unit 96 are imaged on a light receiving surface of the light receiving unit 97. The light receiving unit 97 reads an image on the imaged recording medium.

In this configuration, the recording medium on which the image is formed corresponds to the above-described image carrier, and the illuminating device described in the embodiment of the illuminating device of the invention is used as the illuminating unit 85. The image formed on the recording medium is read by the configuration described in each embodiment of the image reading apparatus of the invention. In the above-described configuration, bending of the recording medium is corrected by the decurler 68, but floating of the recording medium that is transported to the reading position 86 on the standard roll 81 occurs. Accuracy with respect to a color value that is read is demanded for the reading unit 69 that is used to detect a state of the image forming apparatus. However, in the related art, the color value that is read varies due to a variation in an illumination light quantity which is caused by the floating of the recording medium. When using the illuminating unit 85 described as an embodiment of the illuminating device of the invention, an illumination depth is obtained. Accordingly, even when floating of the recording medium occurs, the color value that is read does not vary due to the variation in the illumination light quantity, and thus the demand for accuracy is satisfied. However, the configuration of the image forming apparatus shown in FIGS. 19A and 19B are illustrative only, and it is needless to say that the invention is not limited to this configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An illuminating device comprising:
    a cylindrical lens in which a light incidence surface and a light emission surface, which are opposite to each other, extend in a longitudinal direction; and
    a light source that is disposed in such a manner that a paraxial virtual image of the light source due to the light incidence surface of the cylindrical lens is set to be in a predetermined range including a center of curvature of the light emission surface so that convergence characteristics with respect to skew light beams due to a distance between a light source and a light incidence surface are reduced.

2. The illuminating device according to claim 1,
    wherein the cylindrical lens is configured in such a manner that a radius of curvature of the light emission surface is ½ or more times a distance from a position of the paraxial virtual image due to the light incidence surface to the light emission surface.

3. The illuminating device according to claim 2,
    wherein the cylindrical lens is configured in such a manner that a distance from the light incidence surface to the light source is less than ⅗ times the radius of curvature of the light emission surface of the cylindrical lens.

4. The illuminating device according to claim 3,
    wherein when viewed from a cross-section perpendicular to a longitudinal direction, the cylindrical lens is configured to include an inclined portion, in which a length of the light emission surface is shorter than a length of the light incidence surface, at least at a part.

5. The illuminating device according to claim 2,
    wherein when viewed from a cross-section perpendicular to a longitudinal direction, the cylindrical lens is configured to include an inclined portion, in which a length of the light emission surface is shorter than a length of the light incidence surface, at least at a part.

6. The illuminating device according to claim 5, wherein an angle of the inclined portion and a distance between the light incidence surface and the light emission surface satisfy conditions in which among light beams incident from the light incidence surface, light beams incident to the inclined portion are totally reflected, and among the reflected lights, light beams incident to the light emission surface are totally reflected from the light emission surface or refracted to a region not ranging across a region that is illuminated.

7. The illuminating device according to claim 1, wherein the cylindrical lens is configured in such a manner that a radius of curvature of the light emission surface is ½ times to 2 times a distance from a position of the paraxial virtual image due to the light incidence surface to the light emission surface.

8. The illuminating device according to claim 7, wherein the cylindrical lens is configured in such a manner that a distance from the light incidence surface to the light source is less than ⅗ times the radius of curvature of the light emission surface of the cylindrical lens.

9. The illuminating device according to claim 8, wherein when viewed from a cross-section perpendicular to a longitudinal direction, the cylindrical lens is configured to include an inclined portion, in which a length of the light emission surface is shorter than a length of the light incidence surface, at least at a part.

10. The illuminating device according to claim 7, wherein when viewed from a cross-section perpendicular to a longitudinal direction, the cylindrical lens is configured to include an inclined portion, in which a length of the light emission surface is shorter than a length of the light incidence surface, at least at a part.

11. The illuminating device according to claim 10, wherein an angle of the inclined portion and a distance between the light incidence surface and the light emission surface satisfy conditions in which among light beams incident from the light incidence surface, light beams incident to the inclined portion are totally reflected, and among the reflected lights, light beams incident to the light emission surface are totally reflected from the light emission surface or refracted to a region not ranging across a region that is illuminated.

12. The illuminating device according to claim 1, wherein the cylindrical lens is configured in such a manner that a distance from the light incidence surface to the light source is less than ⅗ times a radius of curvature of the light emission surface of the cylindrical lens.

13. The illuminating device according to claim 12, wherein when viewed from a cross-section perpendicular to a longitudinal direction, the cylindrical lens is configured to include an inclined portion, in which a length of the light emission surface is shorter than a length of the light incidence surface, at least at a part.

14. The illuminating device according to claim 13, wherein an angle of the inclined portion and a distance between the light incidence surface and the light emission surface satisfy conditions in which among light beams incident from the light incidence surface, light beams incident to the inclined portion are totally reflected, and among the reflected lights, light beams incident to the light emission surface are totally reflected from the light emission surface or refracted to a region not ranging across a region that is illuminated.

15. The illuminating device according to claim 1, wherein when viewed from a cross-section perpendicular to a longitudinal direction, the cylindrical lens is configured to include an inclined portion, in which a length of the light emission surface is shorter than a length of the light incidence surface, at least at a part.

16. The illuminating device according to claim 15, wherein an angle of the inclined portion and a distance between the light incidence surface and the light emission surface satisfy conditions in which among light beams incident from the light incidence surface, light beams incident to the inclined portion are totally reflected, and among the reflected lights, light beams incident to the light emission surface are totally reflected from the light emission surface or refracted to a region not ranging across a region that is illuminated.

17. An image reading apparatus comprising:
the illuminating device according to claim 1; and
a light receiving unit that receives reflected light from an image carrier that is illuminated by the illuminating device.

18. The image reading apparatus according to claim 17, wherein the illuminating device irradiates the image carrier with illumination light beams in a predetermined angle range.

19. The image reading apparatus according to claim 18, wherein an irradiation angle of the illumination light beams emitted from the illuminating device is from 39° to 50° with respect to a normal direction of the image carrier.

20. An image forming apparatus comprising:
the image reading apparatus according to claim 17, wherein the image reading apparatus is disposed on a recording medium transport path.

* * * * *